United States Patent [19]
Katsurabayashi et al.

[11] Patent Number: 5,996,002
[45] Date of Patent: Nov. 30, 1999

[54] COLLABORATIVE WORK SUPPORT SYSTEM AND METHOD TO FACILITATE THE PROCESS OF DISCUSSION IN A MEETING USING A SHARED WINDOW

[75] Inventors: Hiroshi Katsurabayashi; Satoshi Ichimura, both of Nakai-machi, Japan

[73] Assignee: Fuji Xerox Co., Ltd., Tokyo, Japan

[21] Appl. No.: 08/898,932

[22] Filed: Jul. 23, 1997

[30] Foreign Application Priority Data

Jul. 26, 1996 [JP] Japan ..................... 8-215034

[51] Int. Cl.[6] ............................................ G06F 3/14
[52] U.S. Cl. ................................. 709/204; 709/213
[58] Field of Search ................. 395/200.35; 709/204, 709/213

[56] References Cited

U.S. PATENT DOCUMENTS

| 5,392,400 | 2/1995 | Berkowitz et al. | 395/200.35 |
|---|---|---|---|
| 5,717,856 | 2/1998 | Carleton et al. | 395/200.35 |
| 5,742,670 | 4/1998 | Bennett | 379/142 |
| 5,761,419 | 6/1998 | Schwartz et al. | 395/200.35 |
| 5,781,727 | 7/1998 | Carleton et al. | 395/200.35 |
| 5,819,038 | 10/1998 | Carleton et al. | 709/204 |
| 5,844,553 | 12/1998 | Hao et al. | 345/329 |
| 5,872,924 | 2/1999 | Nakayama et al. | 345/331 |

FOREIGN PATENT DOCUMENTS

| 3-58658 | 3/1991 | Japan . |
|---|---|---|
| 3-119476 | 5/1991 | Japan . |
| 5-89217 | 4/1993 | Japan . |
| 6-161956 | 6/1994 | Japan . |
| 7-182365 | 7/1995 | Japan . |

OTHER PUBLICATIONS

"WYSIWIS Revised: Early Experiences with Multiuser Interfaces", M. Stefik, et al., Xerox Palo Alto Reseach Center, vol. 5, No. 2, Apr. 1987, pp. 147–167.

"Team WorkStation: Towards a Seamless Shared Workspace", NTT Human Interface Laboratories, CSCW 90 Proceedings, Oct. 1990, pp. 13–26.

"gIBIS: A Hypertext Tool for Exploratory Policy Discussion", Jeff Conklin et al., CSCW 88 Proceedings, Sep. 1988, pp. 140–152.

Fractal Design Art School User's Manual.

*Primary Examiner*—Krisna Lim
*Attorney, Agent, or Firm*—Oliff & Berridge, PLC

[57] ABSTRACT

A collaborative work support system that is performed on plural computers each of which is assigned for an operator, and supports collaborative work in which the plural computers display common data and each operator operates the displayed common data through his own computer. The collaborative work support system includes: a shared data storage for storing shared data to be displayed on each computer; an individual data storage for storing individual data, which is individually created by a specific operator and individually displayed on any of the computers; an individual data sender for sending the individual data to other computers in response to a command from the specific operator who created the individual data so as to display the individual data on other computers as created shared data; and a manager for managing so that the individual data is stored in the shared data storage with other data associated with the individual data as a unit of storage.

15 Claims, 33 Drawing Sheets

| Page No. | Layer No. | Proposer | Display State | Submission Time | Selection Time | Selection Release Time | Data Type | Data ID |
|---|---|---|---|---|---|---|---|---|
| 1 | 1 | Katsura | Display | 2.8 11:13:21 | 2.8 11:31:14<br>2.8 12:4:45 | 2.8 11:19:48<br>2.8 11:47:17<br>2.8 12:14:4 | Stroke<br>String<br>Image | 1<br>1<br>1 |
| | 2 | Ichimura | Undisplay | 2.8 11:19:48 | | 2.8 11:31:14 | Stroke<br>String<br>Image<br>String<br>Stroke<br>Stroke<br>Stroke | 1<br>1<br>1<br>4<br>21<br>27<br>28<br>29 |
| | 3 | Hayashi | Display | 2.8 11:47:17 | 2.8 12:14:14 | 2.8 12:4:45<br>2.8 12:24:26 | Stroke<br>String<br>Image<br>String<br>Stroke<br>Stroke | 1<br>1<br>1<br>8<br>42<br>48<br>49 |
| | 9999 | Individual layer | Undisplay | | | | Stroke | 1 |

FIG.4A

| Page No. | Layer No. | Proposer | Display State | Submission Time | Selection Time | Selection Release Time | Data Type | Data ID |
|---|---|---|---|---|---|---|---|---|
| ... | ... | ... | ... | ... | ... | ... | ... | ... |
| 2 | 1 | Aonuma | Display | 2.8 12:24:26 | | 2.8 12:56:16 | String | 9 |
| | | | | | | | String | 10 |
| | | | | | | | String | 11 |
| | | | | | | | Image | 2 |
| | | | | | | | Stroke | 101 |
| | | | | | | | Stroke | 102 |
| | | | | | | | Stroke | 103 |
| | 2 | Katsura | Display | 2.8 12:56:16 | | | String | 9 |
| | | | | | | | Stroke | 121 |
| | 9999 | Individual layer | Undisplay | | | | Stroke | 2 |
| ... | | | | | | | | |

FIG. 4B

| Page No. | Layer No. | Lower layer | | |
|---|---|---|---|---|
| | | Page No. | Layer No. | Relationship |
| 1 | 1 | 1 | 2 | Problem |
| | | 1 | 3 | Problem |
| 1 | 2 | 1 | 3 | Alternative Proposal |
| | | 1 | 4 | Measures |
| | | 1 | 5 | Measures |
| 2 | 1 | 2 | 2 | Alternative Proposal |
| | | 2 | 3 | Alternative Proposal |
| 3 | 1 | 1 | 2 | Problem |
| | | 1 | 3 | Problem |

FIG.5

Individual data submission request

| Operator | PC (Personal Computer) | Request | Request No. | Page No. | Individual Data |
|---|---|---|---|---|---|

FIG.6A

Example of individual data submission request

| Katsura | fugu | submission data | 1 | 2 | |
|---|---|---|---|---|---|

((String, "We need a button"), (Stroke,
((10, 20), (12, 30), (34, 102), (120, 20),
(30, 40), (54, 32), (43, 21))))

FIG.6B

Mode change request

| Operator | PC (Personal Computer) | Request | Request No. | Mode |
|---|---|---|---|---|

FIG.7A

Example of mode change request

| Katsura | fugu | mode change | 32 | asynchronous |
|---|---|---|---|---|

Display state change request

| Operator | PC (Personal Computer) | Request | Request No. | Page No. | Display state |
|---|---|---|---|---|---|

FIG.8B

Example of display state change request

| Katsura | fugu | Display state change | 5 | 2 | (1,0,1,0) |
|---|---|---|---|---|---|

FIG.9A page creation request

| Operator | PC (Personal Computer) | Request | Request No. | Page No. | Object data |
|---|---|---|---|---|---|

FIG.9B

Example of page creation request

| Katsura | fugu | page creation | 1 | 1 | (1, 3) |
|---|---|---|---|---|---|

FIG.10A

Writing layer change request

| Operator | PC (Personal Computer) | Request | Request No. | Page No. | Writing layer |
|---|---|---|---|---|---|

FIG.10B

Example of writing layer change request

| Katsura | fugu | Writing layer change | 5 | 2 | 1 |
|---|---|---|---|---|---|

FIG.11A layer creation request

| Operator | PC (Personal Computer) | Request | Request No. | Page No. | Merging layers |
|---|---|---|---|---|---|

FIG.11B

Example of layer creation request

| Katsura | fugu | layer creation | 1 | 1 | (1, 3) |
|---|---|---|---|---|---|

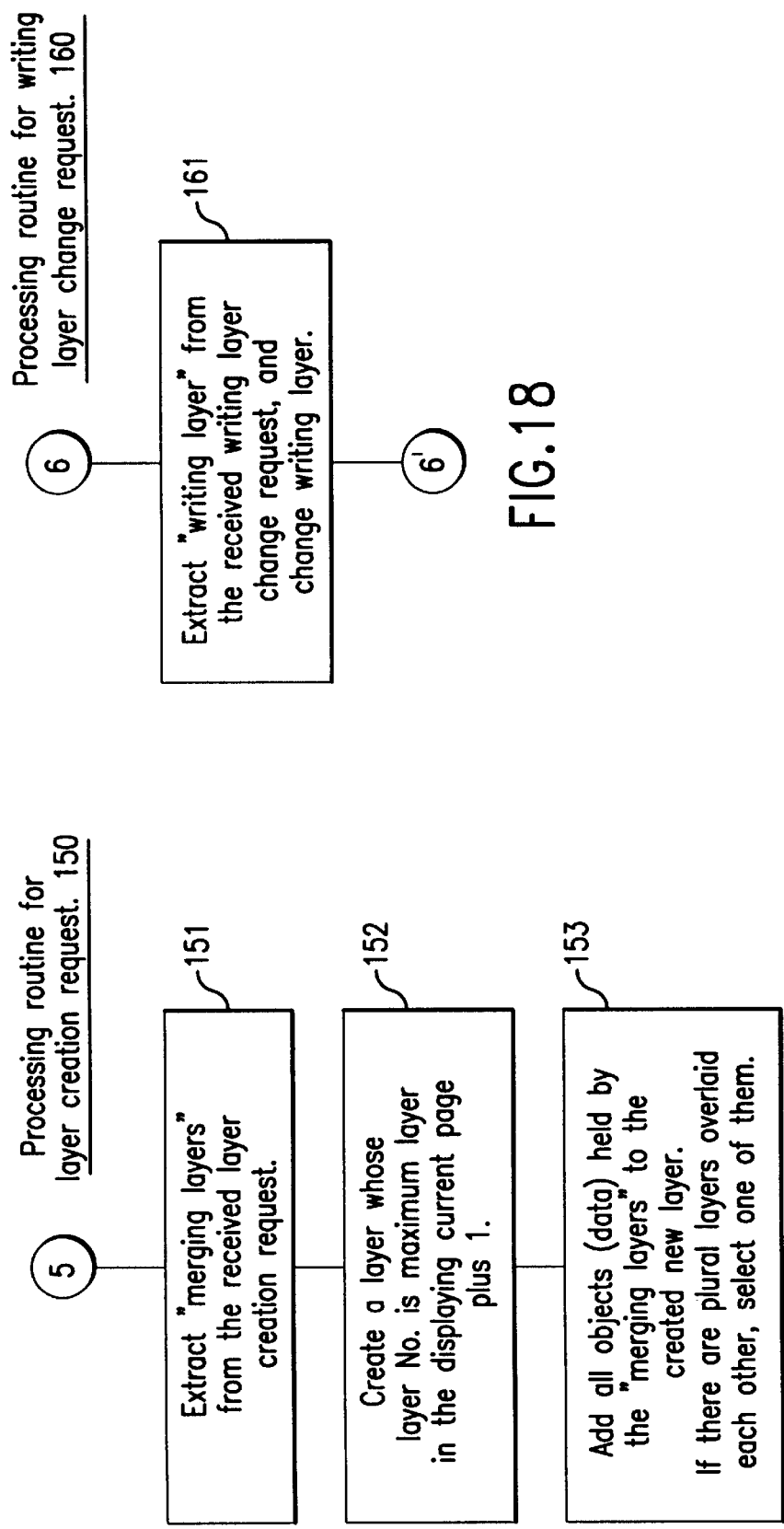

COLLABORATIVE WORK SUPPORT SYSTEM AND METHOD TO FACILITATE THE PROCESS OF DISCUSSION IN A MEETING USING A SHARED WINDOW

BACKGROUND OF THE INVENTION

1. Field of Invention

This invention relates to a collaborative work support system that support collaborative works performed by plural users using shared windows on computers.

2. Description of Related Art

Conventionally, a system on which participants discuss by displaying shared data on shared windows and exchanging real time messages via computer network is well-known.

The following are known as this kind of system Colab System of Palo Alto Lab. of Xerox Co. (M. Stefik, D. G. Bobrow, G. Foster, S. Lanning, and D. Tatar Xerox Palo Alto, Research Center "WYSISIS Revised: Early Experiences with Multiuser Interfaces", ACM Transaction on Office Data Systems, Vol.5, No.2, April 1987, Pages 147–167); TeamWorkstation of Nippon Telephone & Telecom (Ishii Hiroshi, "TeamWorkstation: Towards a Seamless Shared Workspace", CSCW 90 Proceedings, October 1990, pp.13–26 and Japanese Patent Laid-Open Hei.3-119476); and MERMAID (Japanese Patent Laid-Open Hei.3-58658).

In these system, for example, when plural participants who are remote from each other have a meeting, a group for the meeting is created by specifying addresses of workstations or the like used by the participants, and an application program necessary for the meeting is invoked. Then, the participants exchange messages each other. The computers for all the participants (operators of a collaborative work referred to "meeting") display a common screen image (shared window). As a result of operations performed in the shared window for one of the participants, all the other shared windows are changed to the same.

For example, each participant can write an opinion into the shared window through his computer. In response to an opinion written by a participant, another participant can write another opinion through his computer. Thus, even if they use plural computers, they can discuss each other as if they share the opinions on a blackboard.

These systems record the final result of data that is displayed on the shared window and written into the shared window. Later, the recorded data can be played back and are seen as a meeting record.

For example, there is a case that participants have a meeting using a blackboard. While some of them have a lively discussion, others who does not take part in the discussion think another proposal or an opinion from another view point and write it onto papers. Then the others submit the new proposal in pauses of the lively discussion.

However, in many cases, the submitted data written on papers is not stored or distributed. In particular, when participants remote from each other have a meeting by using a television conference system, it is rare to distribute materials that are not prepared beforehand.

It would be possible to store these proposal by using the function for storing a result provided by the shared window of the system described above. However, in the system using shared windows, when a participant who does not participate in a lively discussion writes into a shared window by using his own computer, the written data appears on the shared windows of the other computers and disturb the discussion.

In view of this problem, Japanese Patent Laid-Open Hei.5-89217 and Japanese Patent Laid-Open Hei.6-161956 disclose collaborative work support systems in which while some participants have a lively discussion by using shared windows, the other participants can individually write their opinions without disturbing the participants who have the lively discussion.

The collaborative work support system disclosed by Hei.6-161956 manages data of opinions for each participant who submits his opinion to the shared window and picks up differences among opinions of the participants. Thus, this system can automatically provides a difference among opinions of participants or a difference between shared data and an opinion of a participant.

When meeting data has been recorded during a meeting and contents of the meeting are played back after the meeting, it is desired to edit the recorded meeting data easily. The meeting data can include the following: sounds; screen images of the shared window; and references by participants to the materials for meeting displayed on a screen.

As an art for editing minutes, for example, Japanese Patent Laid-Open Hei.7-182365 discloses a multimedia minutes creation support system that specifies a person who refers to materials for meeting in accordance with records of references by participants to the materials for meeting during the meeting and creates a search file that stores a starting time and an end time of an event occurring on computers, such as a reference operation. When creating minutes, this system can play back images and sounds of the scene desired by the minutes creator according to the search file.

A system that records data regarding a structure of discussion during the discussion and visualizes the process of the discussion according to the recorded data is also known. (e.g. Jeff Conklin, Michael L. Begeman. "gIBIS: A Hypertext Tool for Exploratory Policy Discussion", CSCW88 Proceedings, September, 1988, pp.140–152)

When the record of a meeting is played back, it is important to make the process of the discussion understandable.

However, the above-described shared window system only stores the final result of the data written into the shared window. In many cases, it is difficult to understand the process of a discussion by observing the final result.

As described above, the collaborative work support system disclosed by Japanese Patent Laid-Open Hei.6-161956 manages data of opinions for each participant who submits data of opinions to the shared window. Thus, difference of opinions among the participants or difference between an opinion of each participant and shared data can be obtained automatically. However, it is difficult to know the flow of discussion, since a process of discussion in a meeting can be known only by the changes of opinions of plural participants as time lapses.

The multimedia minutes creation support system disclosed by Japanese Patent Laid-Open Hei.7-182365 records the timing of reference to the materials for meeting and the timing when participants start speaking. However, those times are recorded simply on a time axis. Thus, it does not manage data as a set of opinions of participants of a meeting in association with each other.

Thus, for example, when the former point in question recovers once after the point in question has been changed, there is no way to record the recovery of the former point in question as a flow of the discussion.

When plural participants discuss, it is difficult to conjecture change points of the discussion according to only changes of speakers and materials for meeting that the participants refer to. In many cases, while participants refer to the same material for meeting, they discuss from many viewpoints. Thus, it is difficult to conjecture the change of point in question according to only the starting time of speaking and the timing of reference to materials for meeting.

In the above-described system that visualizes the process of a discussion by recording data of the argument structure, participants of a meeting should submit an opinion after specifying the structure of the opinion in detail. For example, they should specify the subject of the opinion or whether the opinion agrees to the subject, or the like. Since the participant should consider carefully to specify the structure, it is difficult to specify the structure while discussing. In addition, the detailed argument structure is represented as a block of complicated lines on a screen. Thus, this system can show the logical structure. However, it is difficult for the system to show the flow of discussion after the meeting.

Conventionally, it is provided a system that stores a history of operations on the computer performed by the user and repeats the operations in the order of time so as to reproduce the user's operations (Fractal Design Art School). It may be possible to apply this system to the system that stores a history of operations performed by the user in a meeting and plays back the operations. However, even if a history of operations performed by the user is stored and all the operations are reproduced in the order of time, it is difficult to know the change point of discussion unless observing and fully confirming the contents.

In other words, a person who plays back and sees the contents of a meeting is required to reconstruct a set of opinions in association with each other and change point of points in question. That is, a history of sets of opinions in association with each other and change points of points in question cannot be stored. Thus, when people understand the contents of meeting in different way or long time passes after the meeting, even the participants of the meeting sometimes cannot reconstruct it.

SUMMARY OF THE INVENTION

The present invention has been made in view of the above circumstances. An object of the present invention is to provide a collaborative work support system and a method for managing data of collaborative work that make it easy to understand the process of discussion in a meeting using the shared window.

As described above, the following case frequently happens: while some participants in a collaborative work have a lively discussion, another participant who does not join the discussion thinks a proposal or an opinion from the other view points and writes it down on papers, and then submits the new proposal in a pause of the lively discussion. In many case, such change points of the discussion becomes important to understand the flow of the discussion in and after the collaborative work.

In the present invention, while some operators are discussing on the shared window, another operator can write his individual opinion on his own computer without disturbing the discussion, and can submits the individual opinion as shared data in a pause of the discussion. Then, opinions within an interval starting with when a first individual opinion is submitted and ending with when another individual opinion is submitted are managed as a set of opinions associated with the first individual opinion. The data of collaborative work is reproduced in a unit of the set of opinions. Accordingly, the present invention make it easy to understand a flow of discussion in a collaborative work.

To achieve the object, as embodies and broadly described herein, this invention provides a collaborative work support system that supports collaborative work on a plurality of computers that are connected with each other and each of which is assigned for an operator and displays shared data, and each operator can change the displayed shared data on his own computer while other computers display the shared data, comprising: a shared data storage for storing shared data to be displayed on each computer; an individual data storage for storing individual data, which is individually created by a specific operator and individually displayed on any of the computers; an individual data sender for sending the individual data to other computers in response to a command from the specific operator who created the individual data so as to display the individual data on other computers as created shared data; and a manager for managing so that the individual data is stored in the shared data storage with other data associated with the individual data as a unit of storage.

This invention further provides a method for managing data for collaborative work on a plurality of computers that are connected with each other and each of which is assigned for an operator and displays shared data, and each operator can change the displayed shared data on his own computer while other computers display the shared data, comprising the steps of: receiving individual data, which is individually created by a specific operator and individually displayed on any of the computers; sending the individual data to other computers in response to a command from the specific operator who created the individual data so as to display the individual data on other computers as created shared data; and managing so that the individual data is stored with other associated data with the individual data as a unit of storage.

BRIEF DESCRIPTION OF THE DRAWINGS

FIG. 4 shows an example of a data structure of index data used by the shared & individual data manager shown in FIG. 1.

FIG. 5 shows an example of a data structure of the logical connection between layers stored in the associating section.

FIGS. 6A and 6B show an example of a data structure of an individual data submission request.

FIGS. 7A and 7B show an example of a data structure of a mode change request.

FIGS. 8A and 8B show an example of a data structure of a display state change request.

FIGS. 9A and 9B show an example of a data structure of a page creation request.

FIGS. 10A and 10B show an example of a data structure of a writing layer change request.

FIGS. 11A and 11B show an example of a data structure of a layer creation request.

FIG. 17 is a flowchart illustrating a part of processing (for a layer creation request) executed by the shared & individual data manager.

FIG. 18 is a flowchart illustrating a part of processing (for a writing layer change request) executed by the shared & individual data manager.

DETAILED DESCRIPTION OF PREFERRED EMBODIMENTS

Figure 2:
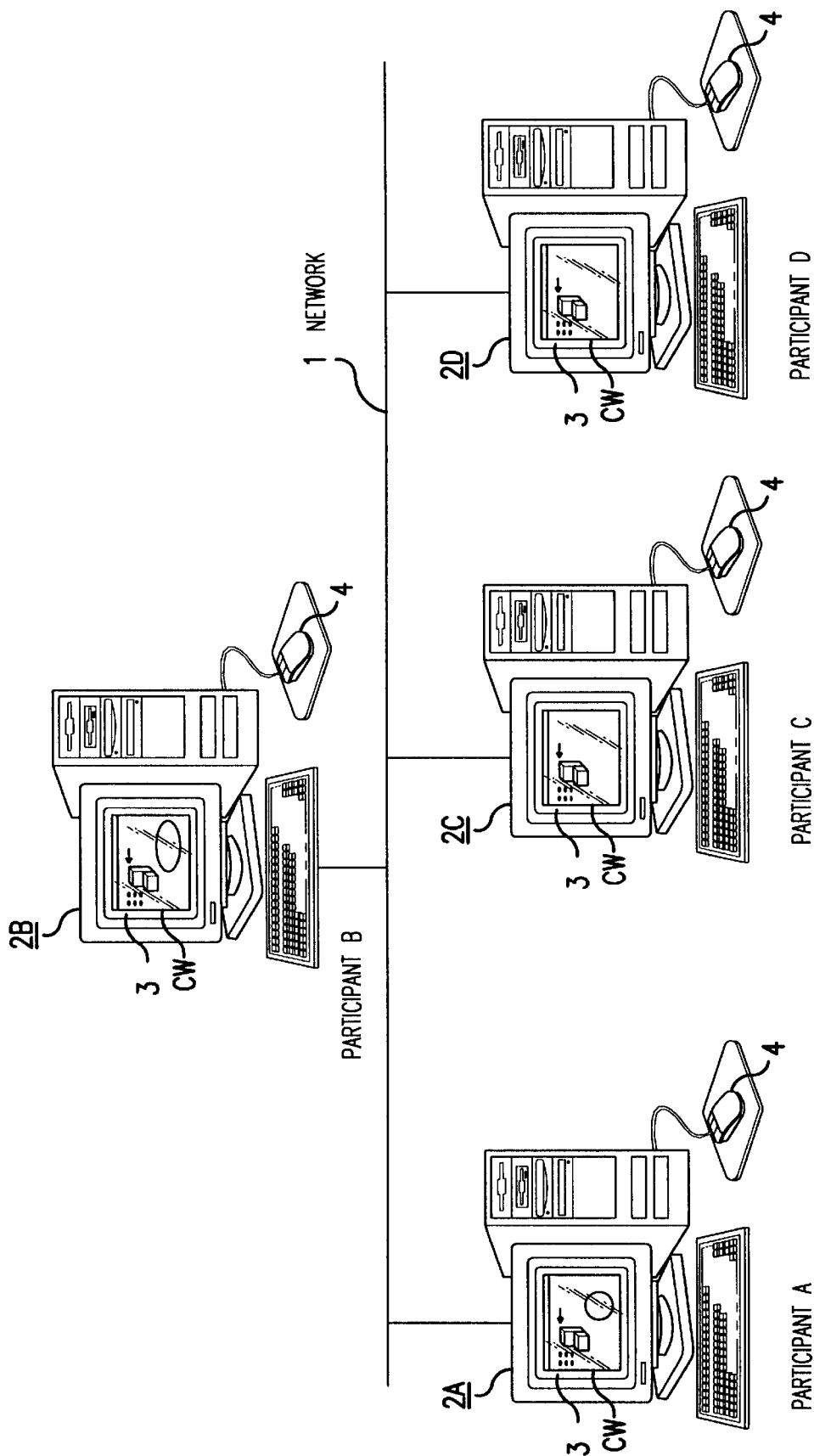
FIG. 2 shows a system configuration of the embodiment when the collaborative work support system of the present invention is used for the meeting at seat.

FIG. 2 shows a system configuration of an embodiment of the collaborative work support system used as so-called network meeting, and an example of the screen images while this system is being used. Plural personal computers, e.g. four personal computers 2A, 2B, 2C and 2D in this embodiment, connected with each other via network 1 constitutes the system. Operators of collaborative work, that is meeting participants A, B, C and D, operate their personal computers 2A, 2B, 2C and 2D at their seats, respectively, so that they hold a meeting.

The personal computers 2A, 2B, 2C and 2D exchange data via network 1, and displays 3 of the personal computer share a common screen image. In other words, each display 3 of the personal computers 2A, 2B, 2C and 2D displays a shared window CW.

When the participants A, B, C and D input data, such as a note for a meeting, through their personal computers 2A, 2B, 2C and 2D by using operation input units 4, personal computers 2A, 2B, 2C and 2D exchange the data with each other via network 1 and the shared windows CW on the displays 3 displays a common screen image. Thus, the participants A, B, C and D can discuss through the shared windows CW.

In this embodiment, each of the personal computers 2A, 2B, 2C and 2D is in the synchronous mode or the asynchronous mode as described later. When a personal computer is in the synchronous mode, the personal computer exchanges data with the other personal computers so that their shared windows CW share a common screen image. When a personal computer is in the asynchronous mode, input data, such as a note written by the user into the shared window CW of the personal computer, is not sent to the other personal computers. Thus the screen image in the shared window CW of the personal computer being in the asynchronous mode is different from those of the other personal computers being in the synchronous mode.

Therefore, when a personal computer 2A, 2B, 2C or 2D is in the asynchronous mode, each of the participants A, B, C and D can write individual data, which is not shared with the other participants, into the shared windows CW of his own personal computer. Since the individual data is not sent to the other personal computers being in the synchronous mode, the individual data is not displayed on the shared window CW of the personal computer in the synchronous mode. Thus, the individual data does not disturb the discussion performed through the shared windows CW of personal computers in the synchronous mode.

In the example shown in FIG. 2, since personal computers 2C and 2D are in the synchronous mode, a common image is displayed on their shared windows. Meanwhile, since personal computers 2A and 2B are in the asynchronous mode and each of the participants A and B writes individual data into his shared window, images displayed on the personal computers 2A and 2D are different from those of the personal computers 2C and 2D.

Each of the personal computers 2A, 2B, 2C and 2D manages the data displayed on the shared window CW by distinguishing shared data, which is shared by the other personal computers, from individual data, which is not shared by the other computers.

New shared data is sequentially stored into a shared data memory of each personal computer 2A, 2B, 2C or 2D. The personal computer in the synchronous mode displays a common current image in the shared window CW on the display screen.

The personal computer in the asynchronous mode displays an image made by adding individual data to the shared data that is the latest when the personal computer was in the synchronous mode in the shared window CW. The personal computer in asynchronous mode also stores new shared data into the shared data memory thereof. But the new shared data is not displayed on the shared window CW until the personal computer returns to the synchronous mode. The individual data are stored in the individual data memory.

The participant can submit the individual data to the shared windows of the other participants at appropriate time so as to make the individual data an subject of discussion. For example, when a participant submits individual data by operating the input operation unit 4 in pauses of the discussion between C and D, the individual data become shared data. Thus, the individual data are stored in the shared data memory as the latest shared data. Further, the individual data is sent to the other personal computers and stored in the shared data memories of the other personal computers. If the other personal computers are in the synchronous mode, the individual data is displayed on their shared windows CW.

Then, the personal computer that submits the individual data turns to be in the synchronous mode and displays a screen image that is common to all the other personal computers in the synchronous mode on the share window CW. Then, discussion regarding the submitted individual data begins.

In this embodiment, shared data are divided when the individual data is submitted to be shared data. In other words, opinions (shared data) within an interval starting with when first individual data is sent from a personal computer to the other personal computers so as to be common data shared by plural personal computers and ending with when second individual data is submitted to be shared data constitute a set of opinions associated with the first individual data. The set of opinions associated with the first individual data is managed as a single unit.

After individual data is submitted, opinions thereto are submitted through the shared windows on the personal computers in the synchronous mode. Those opinions constitute a set of data associated with the submitted individual data. The set of data is a display unit and is referred to as a layer hereinafter. Shared data is managed in a unit of the set of data, that is, in a unit of the layer.

Figure 3:
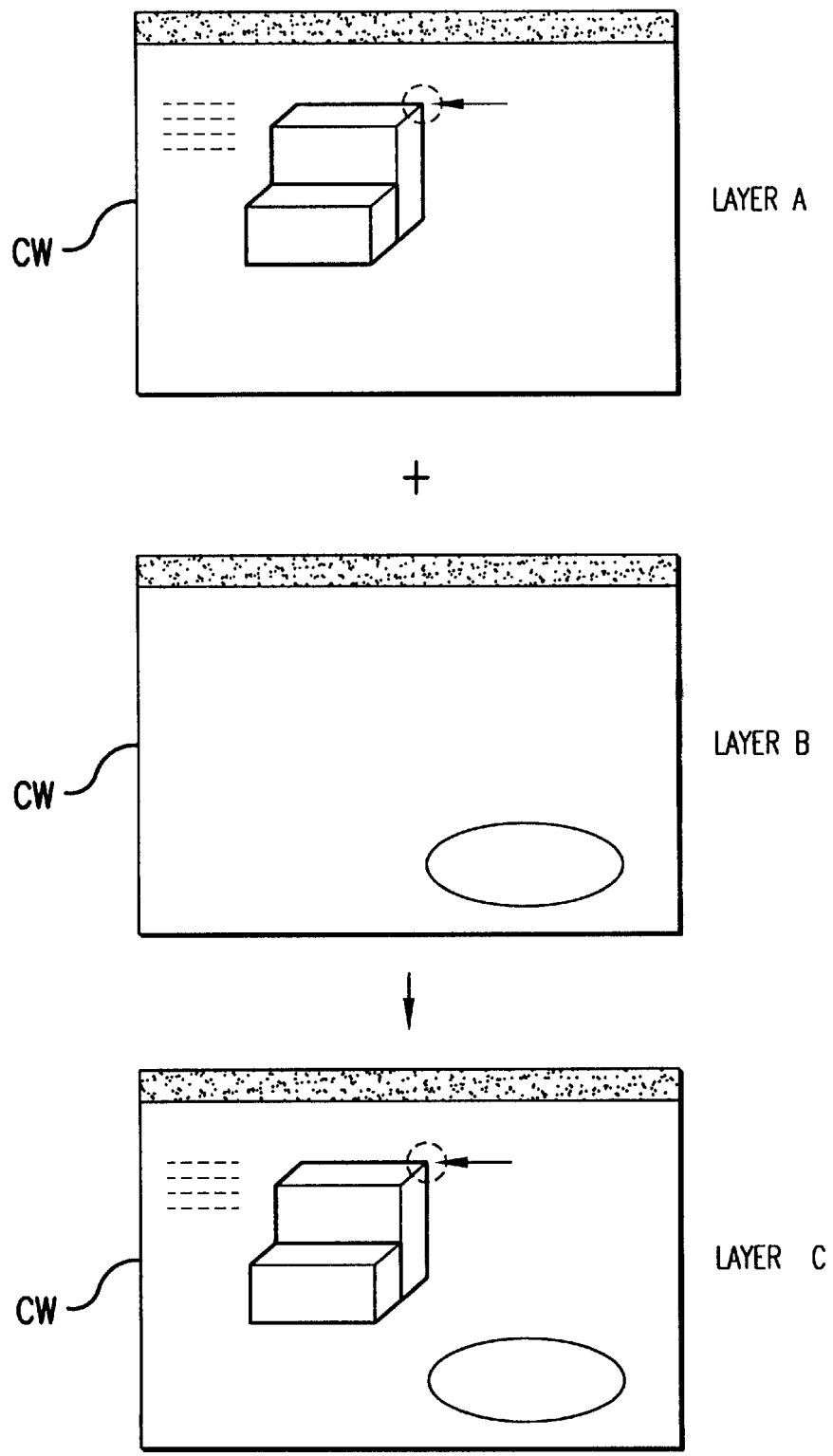
FIG. 3 is a chart that explains display of pages on the shared window in the embodiment of the collaborative work support system of the present invention.

In this embodiment, a unit of the layer constitutes display data for one screen image. A page is represented as a spatial series of layers. For example, as shown in FIG. 3, a series of layer A and layer B constitutes page C. Usually the screen image of a page is displayed on the shared window CW. Each layer can be displayed independently to observe a flow of discussion, of course.

In this embodiment, a page creating operation is provided. The page creating operation creates a page from plural layers selected from the plural layers stored in the shared data memory, instead of a series of layers in the order of submission. The page creating operation is described later in detail.

In addition, a layer in a page can be designated as a display layer or an undisplay layer. Because a page, which is displayed as a series of layers, may includes a layer that does not relate to the discussion, a simple screen image is made by undisplaying the layer.

A function to create a new layer by integrating plural layers is also provided. Further, layers can be associated with each other afterwards. In addition, to clarify the point of discussion, when the discussion begins, a writing layer, into which an opinion will be written through the shared window CW, can be selected.

The operations described above, which are the page creation, display in a unit of layer, designation of undisplaying layer, creation of a integrated layer and selection of a writing layer, are performed on the personal computers that has permission. Permission is a right to operate the shared data displayed on the shared window CW.

In this embodiment, personal computers 2A through 2D can record some kinds of data to be materials for a meeting (multimedia data), such as video images, sounds, still images, which are inputted by a camera, a microphone, a scanner, or the like, and can play back the recorded data afterwards.

In this embodiment, the starting time of recording is the starting time of the meeting. When the recorded data is played back, a position to be played back is specified as a relative time from the starting time of recording. In this embodiment, data for calculation of time when a layer is being displayed is recorded and managed as described later. The data for the calculation includes: time when a layer is created (time when individual data is submitted); time when a note is specified in the layer; or the like. Thus, multimedia data can be played back corresponding to each layer.

Screen data of a subject to be the core of discussion is sent to the personal computers 2A, 2B, 2C and 2D, which are connected with each other via network 1, at the time a meeting begins or prior to a meeting, and is stored as shared data in the shared data memory. Then, the chairman or an arbitrary participant who has permission retrieves the screen data of a subject to be the core of discussion from the shared data memory and displays it on the shared window CW to start discussing, when it is necessary.

Further, it would be possible to store the screen data of a subject to be the core of discussion in the host computer. Then, every time it is required, a person who has permission retrieves and supplies it to shared windows CW, and stores it into the shared data memory.

Figure 1:
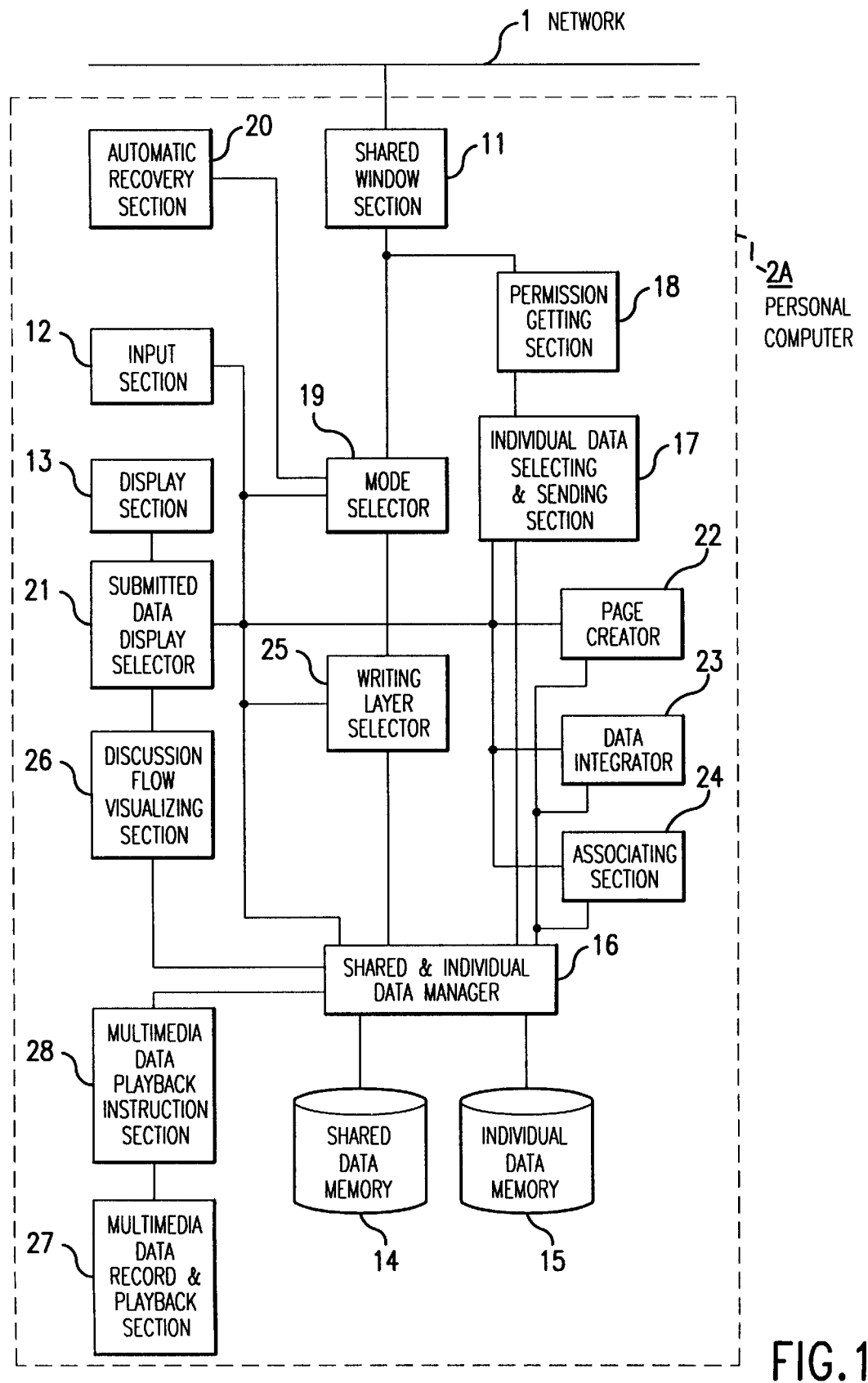
FIG. 1 is a block diagram illustrating a configuration of an embodiment of the collaborative work support system of the present invention.

Each of the personal computers 2A, 2B, 2C and 2D is provided with the processing functional sections as shown in FIG. 1 to execute the processes described above. Each of the processing functional sections shown in FIG. 1 is practically realized as a software executed on the personal computer.

FIG. 1 is a block diagram illustrating processing functions provided with the personal computer 2A. The other personal computers 2B, 2C and 2D also have the same processing functions.

The personal computer has the processing functional sections as shown in FIG. 1, which are shared window section 11, input section 12, display section 13, shared data memory 14, individual data memory 15, shared & individual data manager 16, individual data selecting & sending section 17, permission getting section 18, mode selector 19, automatic recovering section 20, submitted data display selector 21, page creator 22, data integrator 23, associating section 24, writing layer selector 25, discussion flow visualizing section 26, multimedia data record & playback section 27 and multimedia data playback instruction section 28.

The shared window section 11, as described above, synchronously exchanges data and events so that plural operator look at common data, write into it or correct it on their own computers. Thus, the shared window section 11 displays a common screen image on the plural shared windows CW to perform a meeting or discussion thereon.

The input section 12 receives input data for a personal computer from the operation input unit 4, such as a keyboard, mouse and tablet as shown in FIG. 2.

The display section 13 displays the shared window CW on the display 3 shown in FIG. 2 so as to show the user (participant) a result of calculation executed by the personal computer. In this embodiment, the display section 13 also spatially arranges the received list data on a tree, and draws a line based on stroke data (a list of XY coordinates).

The shared data memory 14, as described above, stores shared data, which is shared by the plural personal computers 2A through 2D. Shared data can be stored in a hard disc, a memory area or the other storage.

Individual data memory 15, as described above, stores individual data, which is not shared by the plural personal computers 2A through 2D. Individual data can be stored in a hard disc, a memory area or the other storage.

The shared & individual data manager 16 receives input data from the input section 12, an individual data submission request from the individual data selecting & sending section 17, a display state change request from the submitted data display selector 21, a page creation request from the page creator 22, a layer creation request from the data integrator 23 and a writing layer change request from the writing layer selector 25. Then, the shared & individual data manager 16 executes processing corresponding to each of the received data or requests.

Further, the shared & individual data manager 16 updates shared data and individual data, and stores data regarding a page displaying on the screen of display 3, a displaying layer, a writing layer, a relationship between a page and a layer, and the like.

The shared & individual data manager 16 controls the shared data memory 14 and the individual data memory 15. The shared & individual data manager 16 retrieves shared data and individual data from the shared data memory 14 and the individual data memory 15, respectively. The retrieved shared data or individual data is displayed on the shared window by the display section 13 or is sent to the other personal computers.

Further, the shared & individual data manager 16 receives an instruction for redisplaying from the user through the input section 12, and redisplays the shared window CW. In the redisplay processing, the shared & individual data manager 16 redisplays layers in the order of creation at regular intervals. The interval between layers in redisplay can be specified by the user. An appropriate interval enables the user to understand the flow of discussion.

While layers are redisplayed in the order of creation, instead of displaying at the regular intervals, it would be possible to wait an input of instruction for redisplaying the next layer, and to display the next layer after receiving the user's instruction.

The individual data selecting & sending section 17 receives an instruction of an individual data submission request from the user through the input section 12, selects only individual data to be submitted as shared data by using the shared & individual data manager 16, creates an individual data submission request, and sends it to the other personal computers. The individual data selecting & sending section 17 also sends the individual data submission request to the shared & individual data manager 16.

As described above, in the asynchronous mode, the participant can write individual data, which is not shared with the other participant's personal computers, into the shared window. The individual data is stored into the individual data memory 15. When the participant who writes individual data submits the individual data at the appropriate time in the meeting, the individual data selecting & sending section 17 selects the individual data displayed in the shared window of his personal computer, and sends the selected individual data as the individual data submission request to the other personal computers.

In other words, when individual data is tried to be submitted, the individual data selecting & sending section 17 extracts only the individual data displayed on the shared window in asynchronous mode as transmission data. Thus, the transmission data does not include shared data, of course.

The permission getting section 18 gets permission, which is a right to operate shared data displayed on the shared window. Permission is held by one of the plural personal computers connected each other via network 1. The participant can operate share data by using the personal computer holding permission. For example, the participant can write into the shared window CW in the synchronous mode, create a page from plural layers, integrate plural layers into a layer, associate layers each other and select a writing layer.

In this embodiment, when the permission getting section 18 receives the individual data submission request including individual data to be sent from the individual data selecting & sending section 17, this section 18 at first tries to get permission before the transmission of the individual data. When the permission getting section 18 succeeds to get permission, the individual data is sent from the shared window section 11. If the permission getting section 18 fails to get permission, the individual data is not sent and the permission getting section 18 informs the individual data selecting & sending section 17 of failure to get permission.

The mode selector 19 changes action modes of personal computers from the synchronous mode to the asynchronous mode, or vice versa. When a personal computer receives a mode change request via network 1, the mode selector 19 selects a mode according to the request. For example, when the user who has permission inputs a request to assign the synchronous mode to the computer, the mode of all personal computers connected to the network becomes the synchronous mode so that all participants take part in the essential discussion.

When a personal computer receives input data through the input section 12, the mode selector 19 determines whether the mode should be changed according to the current relationship with the other computers or the current state of the computer. The relationship with the other computers means, for example, whether a personal computer has permission or not. The state of the computer means, for example, the synchronous mode or the asynchronous mode.

For example, when a computer receives input data when it does not have permission, the input data cannot be the shared data, even if the computer is in the synchronous mode. Therefore, the asynchronous mode is selected. In other words, when the user inputs data into shared window CW without getting permission, the asynchronous mode is automatically selected. Thus, individual data can be written in the shared window CW. Thus, the user can write individual data into the shared window CW without thinking the mode of his own computer.

When a mode is changed, the mode selector 19 informs the shared window section 11 of the mode. Further, the mode selector 19 automatically determines whether the written data is individual data or shared data. The mode selector 19 also determines whether the written data is sent to the other computers or not.

When the user performs no operation while the predetermined time lapsed from when the computer became the asynchronous mode, the automatic recovering section 20 informs the mode selector 19 of no operation. The mode selector 19 assigns the synchronous mode to the computer after receiving data indicating no operation from the automatic recovering section 20. Thus, even if the user forgets to make his own computer return to synchronous mode, the computer automatically returns to the synchronous mode so that the user can participate in a discussion of a meeting.

The submitted data display selector 21 receives an instruction that determines whether a layer is displayed or not, from the user through the input section 12. The submitted data display selector 21 instructs the display section 13 to determine whether each layer is displayed on the shared window CW or not. A layer is a set of opinions in association with each other and a unit of administration by the shared & individual data manager 16. Further, the submitted data display selector 21 informs the shared & individual data manager 16 of a display state change request, which requests change of display state of the shared window CW. When a displaying page is replaced, the submitted data display selector 21 determines whether each layer of the page is displayed on the shared window or not according to the data managed by the shared & individual data manager 16, and informs the display section 13 of the result of the determination, that is, display or undisplay of each layer.

The page creator 22 receives an instruction to create a page from the user and sends a page creation request to the shared & individual data manager 16 and the other computers so as to create a new page by collecting all displayed layers.

The data integrator 23 receives an instruction from the user to select plural layers from the plural layers stored in the shared data memory 14, and integrates the selected plural layers into a layer. The data integrator 23 sends a layer creation request to the shared & individual data manager 16 and the other computers. There are a variety of methods to integrate layers. For example, a new layer is created by merging copies of original layers, if the original layers should be left. All layers but the selected one can be merged into the selected layers. The original layers can be deleted after the merging.

The associating section 24 receives an instruction from the user to select plural layers from the plural layers stored in the shared data memory 14, and adds attributes regarding an association between layers to the selected layers. The attribute regarding association between layers is the order of display, the flow of discussion, or the like. The following are examples of attributes: "problem", which means pointing of problems; "alternative proposal", which means a proposal that replaces the old one; and "measures", which means measures against problems.

The writing layer selector 25 receives the user's instruction to select a layer to which a note is written, or on which a copy and paste operation is performed, from the plural layers stored in the shared data memory 14. The writing layer selector 25 sends a writing layer change request to the share & individual data integrating manager 16 and the other computers.

The discussion flow visualizing section 26 arranges and displays plural layers so as to show the user the order thereof or the association therebetween according to the order of creation, the attributes regarding association between layers added by the associating section 24, or the like.

The multimedia data record & playback section 27 receives a variety of data, such as video images, audio data and still images, from cameras, microphones and scanner or the like, records the received data and plays back the data.

The data can be recorded by a digital method or an analog method. The storage medium can be a magnetic tape, a hard disc, or a CD-ROM.

The multimedia data playback instruction section 28 instructs the multimedia data record & playback section 27 to extract multimedia data regarding a specified layer and to play back the extracted multimedia data.

FIG. 4 illustrates a data structure of index data managed by the shared & individual data manager 16. The index data is used for managing shared data and individual data.

"Page No." is an identifier of a page managed when shared data is managed as a set of pages. "Layer No." is an identifier for managing layers. "9999" in the layer No. column is a layer of individual data. "Proposer" is a participant (operator) who submits the layer, that is, the individual data.

"Display state" is an index that shows whether the layer is displayed or not, when the page including the layer is being displayed. As described above, the submitted data display selector 21 refers to this index to determine whether the layer should be displayed or not. The layers having "display" as a value of the "display state" are displayed one over another. The user who has permission specifies a value of "display state" for each layer through the submitted data display selector 21.

"Submission time" is the time when the layer is submitted to be shared data. "Selection time" is the time when the layer is selected as a writing layer. "Selection release time" is the time when the layer, as a current writing layer, is replaced with the other layer. According to the correspondence between these time data and record starting times of multimedia data, multimedia data is played back corresponding to the layer.

"Data type" is a type of an object, which is a part of data included in a layer managed as a set of opinions in associated with each other. The data type includes a stroke, a letter, an image or the like. "Data ID" is an index to distinguish one object from another.

FIG. 5 is a data structure illustrating logical connection between layers stored in the associating section 25. "Page No." of the first column is an identifier of a page including an association object layer. "Layer No." of the second column is the identifier of an layer, by which the layer is managed. "Lower layer" is a counterpart layer, which is logically connected with the association object layer by the data included in the layers.

"Page No." under "lower layer" is an identifier of a page including the counterpart. "Layer No." under "lower layer" is an identifier of the counterpart layer, by which the layer is managed. "Relationship" under "lower layer" is a type of relationship between the association object layer and the counterpart layer.

FIG. 6A is a data structure illustrating an individual data submission request, which is sent from the individual data selecting & sending section 17. FIG. 6B is an example thereof. In FIG. 6A, "operator" is a participant who submits the request. "PC (personal computer)" is a personal computer that the operator who submits the request uses. "Request" is a type of the request to the other computers. "Request No." is an identifier of a command submitted from a personal computer. "Page No." is an identifier of the page that includes the layer of individual data to be submitted. "Individual data" is the individual data to be submitted.

In the example shown in FIG. 6B, the individual data consists of a string "We need a button" and coordinates of strokes of multi-connected line written by using a mouse or a electronic pen.

FIG. 7A shows a data structure of the mode change request described above. FIG. 7B shows an example thereof.

In FIG. 7A, "operator" means a participant who submits the request. "PC (personal computer)" means a personal computer that the operator who submits the request uses. "Request" means a type of the request. "Request No." is an identifier of a command submitted by personal computers. "Mode" is a new mode, which is selected from the synchronous mode and the asynchronous mode. In the example shown in FIG. 7B, the asynchronous mode is specified.

FIG. 8A shows a data structure of the display state change request. FIG. 8B is an example thereof. When a participant instructs, by using his own computer having permission, to change the display states of the layers in the displayed current page through the submitted data display selector 21, the display state change request is sent to the other personal computers.

In FIG. 8A, "operator" means a participant who submits the request. "PC (personal computer)" means the personal computer that the operator who submits the request uses. "Request" means a type of the request. "Request No." is an identifier of the command submitted by personal computers. "Page No." is an identifier of the page to be operated. "Display state" specifies whether each of the plural layers constituting a page, i.e. four layers in this example, is displayed or not. In FIG. 8B, (1, 0, 1, 0) means display states of layer1, layer2, layer3 and layer4 in this order. "1" and "0" mean "display" and "undisplay", respectively.

FIG. 9A shows a data structure of the page creation request submitted by the page creator 22 when the user who has permission instructs to create a new page. FIG. 9B is an example thereof.

In FIG. 9A, "operator" means a participant who submits the request. "PC (personal computer)" means the personal computer that the operator who submits the request uses. "Request" means a type of the request. "Request No." is an identifier of the command submitted by personal computers. "Page No." is an identifier of the page that includes a layer to be operated. "Object data" is layer Nos. of the designated layers constituting a page.

FIG. 10A shows a data structure of the writing layer change request submitted by the writing layer selector 25 when the user who has permission instructs to select the writing layer. FIG. 10B is an example thereof.

In FIG. 10A, "operator" means a participant who submits the request. "PC (personal computer)" means the personal computer that the operator who submits the request uses. "Request" means a type of the request. "Request No." is an identifier of the command submitted by personal computers. "Page No." is an identifier of the page that includes the layer designated as the writing layer. "Writing layer" is a layer No. of the new writing layer.

FIG. 11A is a data structure of the layer creation request submitted by the data integrator 23 when the user who has permission inputs a command for creating a new layer by integrating plural layers. FIG. 11B is an example thereof.

In FIG. 11A, "operator" means a participant who submits the request. "PC (personal computer)" means the personal computer that the operator who submits the request uses. "Request" means a type of the request. "Request No." is provided to identify the command submitted by personal computers. "Page No." is an identifier of the page that includes a layer to be operated. "Merging layers" means layer Nos. of the layers to be merged.

Figure 12:
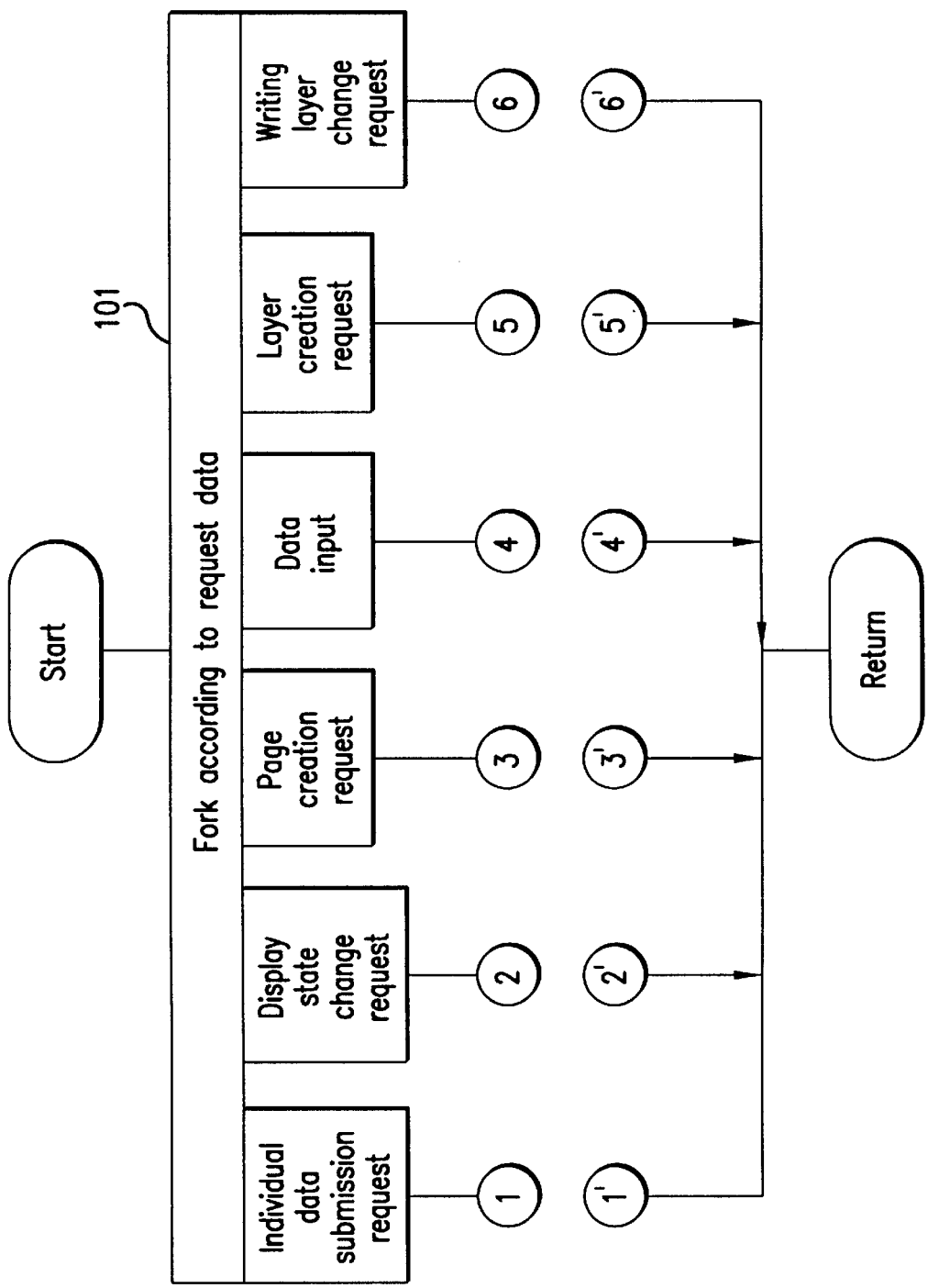
FIG. 12 is a flowchart illustrating the outline of processing executed by the shared & individual data manager.

FIG. 12 is a flowchart showing an outline of the processing executed by the shared & individual data manager 16. In this embodiment, this process routine is invoked as an interruption when a request arises. This process routine can be invoked at intervals of predetermined time. In the first step thereof, it is checked whether a request arises or not. If a request arises, the following process is executed; otherwise the process terminates.

In the flowchart shown in FIG. 12, when data is inputted, in step 101, the shared & individual data manager 16 determines a type of the data, which is one of the following: an individual data submission request; a display state change request; a page creation request; data input; layer creation request; and a writing layer change request. Then the control forks according to the determined type of data (request). The data (request) includes both a request received from the other computers and a request created by his own computer.

Figure 13:
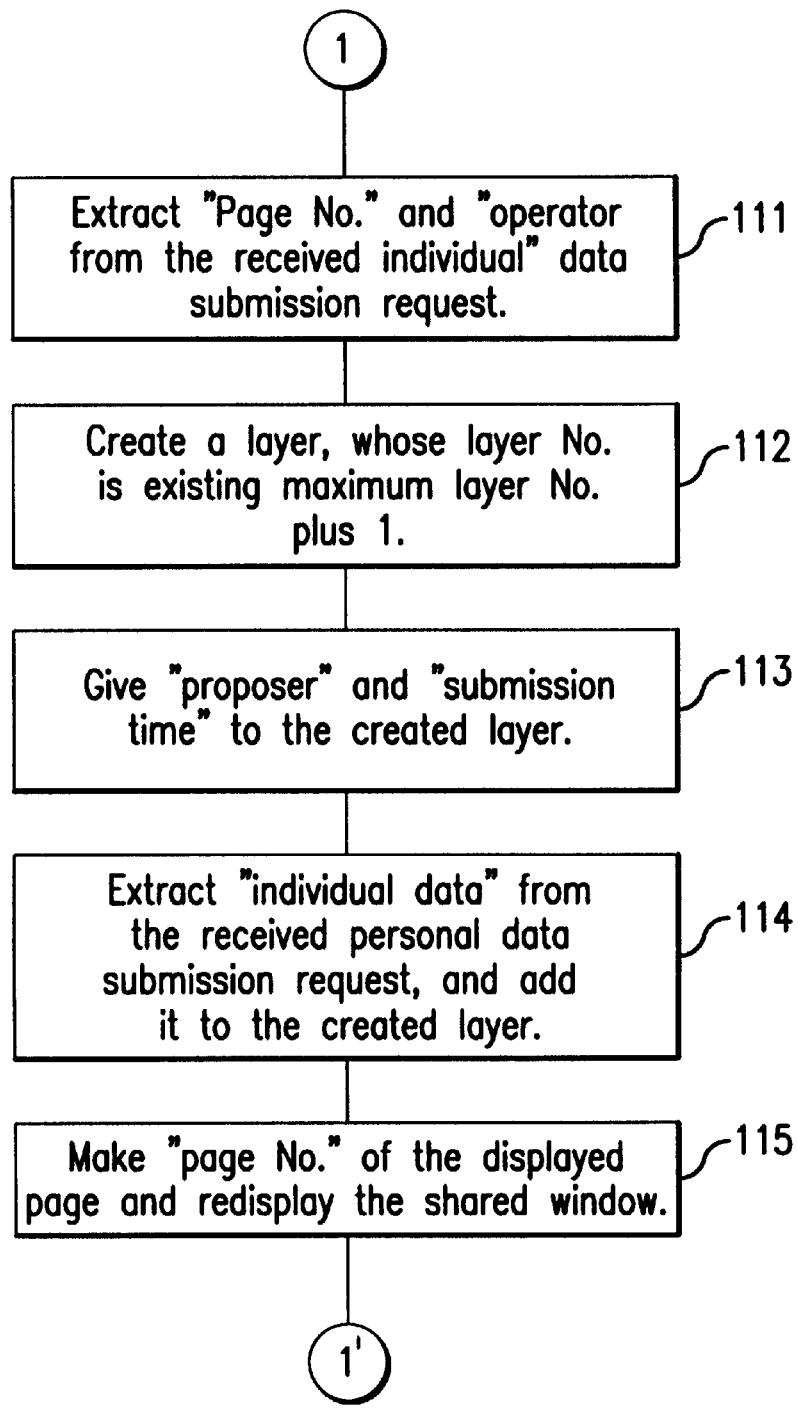
FIG. 13 is a flowchart illustrating a part of processing (for an individual data submission request) executed by the shared & individual data manager.
Figure 15:
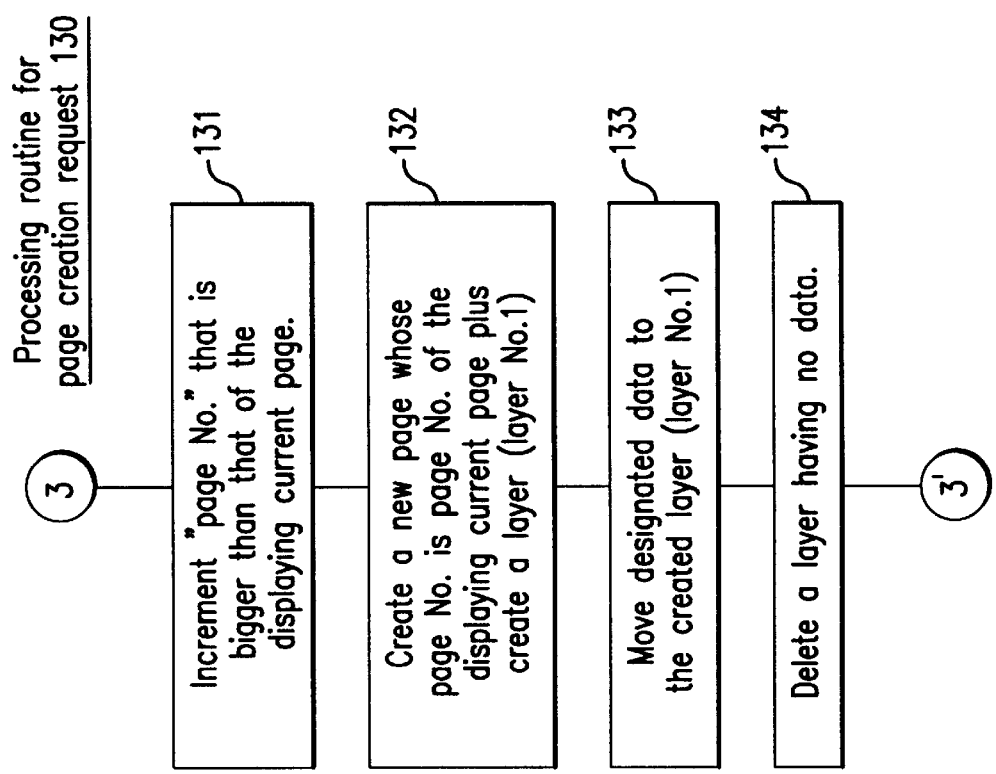
FIG. 15 is a flowchart illustrating a part of processing (for a page creation request) executed by the shared & individual data manager.
Figure 14:
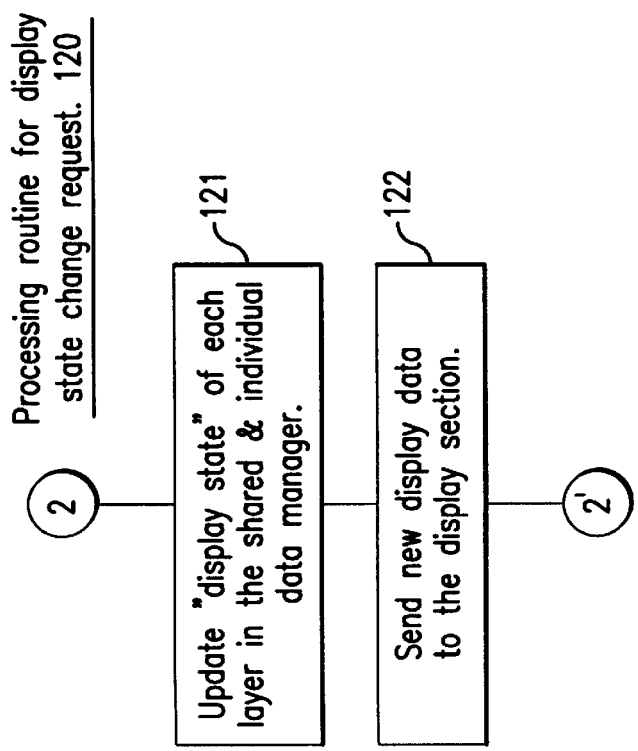
FIG. 14 is a flowchart illustrating a part of processing (for a display state change request) executed by the shared & individual data manager.
Figure 16:
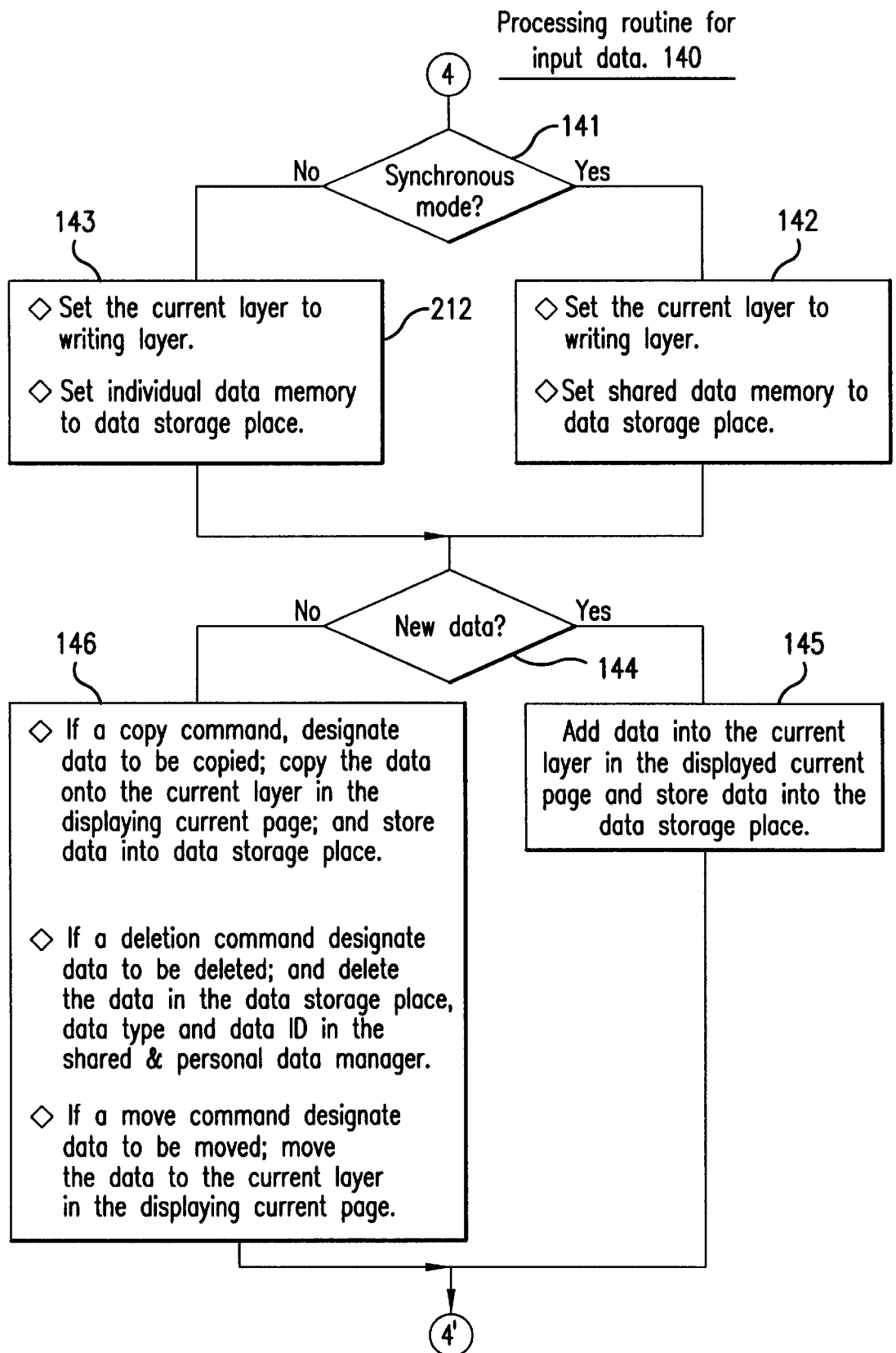
FIG. 16 is a flowchart illustrating a part of processing (for a data input) executed by the shared & individual data manager.

If the request is an individual data submission request, the process shown in FIG. 13 is executed. If the request is a display state change request, the process shown in FIG. 14 is executed. If the request is a page creation request, the process shown in FIG. 15 is executed. If the request is a data input, the process shown in FIG. 16 is executed. If the request is a layer creation request, the process shown in FIG. 17 is executed. If the request is the writing layer change request, the process shown in FIG. 18 is executed.

After the process of each branch is finished, the processing routine shown in FIG. 12 terminates and the next request is waited.

Next, a flowchart of the processing routine 110 shown in FIG. 13 is explained. The shared & individual data manager 16 executes this processing routine when it receives an individual data submission request.

In step 111, "page No." and "operator" are extracted from the individual data submission request as shown in FIG. 6A. In step 112, a new layer is created. The layer No. of the new layer is determined with reference to the index data as shown in FIG. 4 by adding one to the existing maximum layer No. in the page identified by the extracted page No.

In step 113, a proposer and a submission time are given to the created layer. The proposer is the extracted "operator". In step 114, "individual data" is extracted from the received individual data submission request, and is stored as an object held by the created new layer. In step 115, the extracted "page No." is set to the display page, and the shared window CW is redisplayed. Then this processing routine 110 terminates.

Next, a flowchart of the processing routine 120 shown in FIG. 14 is explained. The shared & individual data manager 16 executes this processing routine when it receives a display state change request.

In step 121, "display state" of each layer in the index data as shown in FIG. 4, which is stored in the shared & individual data manager 16, is updated. In step 122, new display data is sent to the display section 13 by the submitted data display selector 21. Then this processing routine 120 terminates.

Next, a flowchart of the processing routine 130 shown in FIG. 15 is explained. The shared & individual data manager 16 executes this processing routine when it receives a page creation request.

In step 131, all the "page No." in the index data, which are greater than that of the displaying current page is incremented. In step 132, a new page consisting of a layer is created. "Page No." of the new page is determined by adding one to the "page No." of the displaying current page. The "layer No." of this layer is 1. In step 133, object data is designated in the shared window and the designated object data are moved to the layer (layer No. 1) of the created new page. In step 134, a layer having no data is deleted. Then this processing routine 130 terminates.

Next, a flowchart of the processing routine 140 shown in FIG. 16 is explained. The shared & individual data manager 16 executes this processing routine when it receives input data.

In step 141, it is checked whether the computer is in the synchronous mode or not. If it is in the synchronous mode, the control proceeds to step 142. In step 142, the latest layer (current layer) is set to the writing layer and the shared data memory 14 is specified as the data storage place. Then, the control proceeds to step 144. If the computer is in the asynchronous mode, the control proceeds to step 143. In step 143, the current layer is set to the writing layer and the individual data memory 15 is set to the data storage place. Then, the control proceeds to step 144.

In step 144, it is checked whether the input data is new or not. If it is new, the control proceeds to step 145. In step 145, the new data is added to the current layer in the displaying current page and is stored into the data storage place.

If the input data is not new, the control proceeds to step 146. In step 146, if a copy command is inputted, data to be copied is designated, and the designated data is copied onto the current layer in the displaying current page and also is stored into the data storage place. If the deletion command is inputted, data to be deleted is designated, the designated data in the data storage place, and the data type and data ID in the index data stored in the shared & individual data manager 16 are deleted. If a move command is inputted, data to be moved is designated, and the designated data is moved to the current layer in the displaying current page.

When the process of the step 146 or the step 146 is finished, this processing routine terminates.

Next, a flowchart of the processing routine 150 shown in FIG. 17 is explained. The shared & individual data manager 16 executes this processing routine when it receives a layer creation request.

In step 151, data of the "merging layers" are extracted from the received layer creation request. In step 152, a new layer is created. The layer No. of the new layer is determined with reference to the index data as shown in FIG. 4 by adding one to the existing maximum layer No. included in the displayed current page. In step 153, all objects on the merging layers are copied onto the created layer. If there are plural objects that are overlaid each other and have the same contents, one of them is selected. Then this processing routine 150 terminates.

Next, a flowchart of the processing routine 160 shown in FIG. 18 is explained. The shared & individual data manager 16 executes this processing routine when it receives a writing layer change request.

This processing routine is consisting of single step 161, in which a writing layer is extracted from the received writing layer change request and the current writing layer is replaced with the extracted writing layer.

Thus, the shared & individual data manager 16 executes a process routine corresponding to each request. And also the shared & individual data manager 16, as shown in FIG. 4, manages each page and layer of shared data and manages individual data by preparing an individual layer whose layer No. is 9999 for the individual data.

Figure 19:
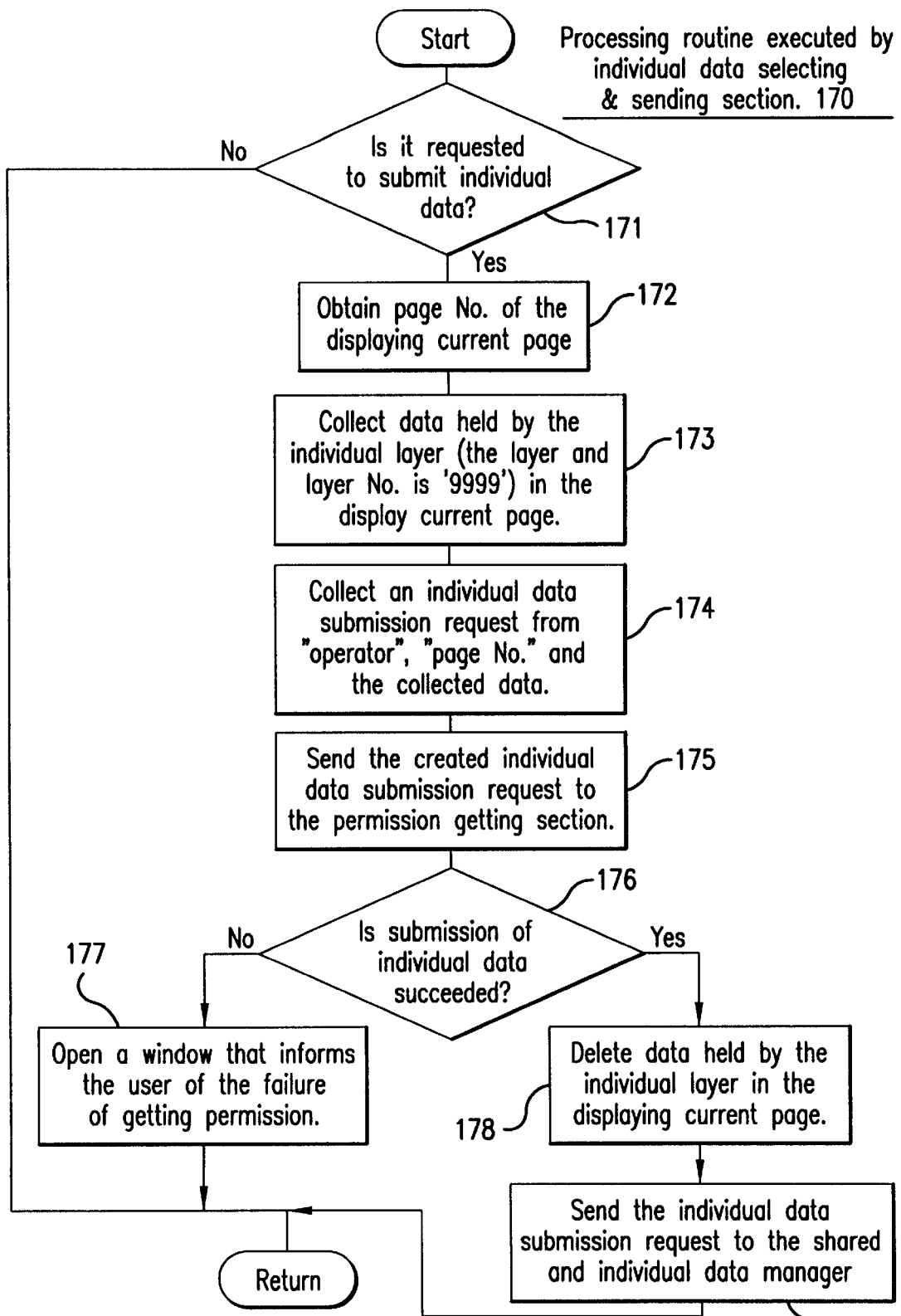
FIG. 19 is a flowchart illustrating an example of a processing routine executed by the individual data selecting & sending section.

Next, an example of the control processing routine 170, which is executed by the individual data selecting & sending section 17 for submitting individual data to the shared window CW as shared data, is explained with reference to the flowchart shown in FIG. 19. In this embodiment, this processing routine is executed repeatedly at intervals of predetermined time.

In step 171, it is checked whether it is requested to submit individual data is requested or not. If it is requested, this processing routine 170 terminates. If it is not requested, the control proceeds to step 172. In step 172, the page No. of the current page displayed in the shared window CW is specified. In step 173, individual data in an individual layer, whose layer No. is 9999, in the displayed current page are collected. This process is executed by using the shared & individual data manager 16.

In step 174, an individual data submission request as shown in FIG. 6A or 6B is created from the following data: page No. specified in step 172; "operator", which is a name of the operator who submits the individual data; "PC (personal computer)", which identifies the personal computer; and the individual data collected in step 173. Then, in step 175, the created individual data submission request is sent to the permission getting section 18.

As explained later, the permission getting section 18 executes permission getting process after receiving the individual data submission request. The permission getting section 18 informs the individual data selecting & sending section 17 of the result of the operation eight getting process. That is, when permission was gotten and the individual data was submitted, "success" is sent; and when permission was not gotten and the individual data was submitted, "failure" is sent. In step 176, the informed result is checked. If the individual data was not submitted, the control proceeds to step 177. In step 177, a window for informing the user who requests submission of the individual data, that permission was not gotten and the individual data was not submitted, is opened. Then, this processing routine 170 terminates.

In step 176, if the result informed by the permission getting section 18 indicates that the individual data was submitted, the control proceeds to step 178. In step 178, the individual data, which is the layer whose layer No. is 9999 in the displaying current page in the index data shown in FIG. 4, is deleted.

In step 179, the individual data selecting & sending section 17 sends the same individual data submission request as what are sent to the other personal computers, to the shared & individual data manager 16. The shared & individual data manager 16 executes the processing shown in FIG. 13 as described above. Thus, the submitted individual data becomes the shared data, are displayed on the shared window CW and stored in the shared data memory 14. The shared & individual data manager 16 in the other personal computers also executes processing to accept the submitted individual data as the shared data and displays it on the share window CW. After the process in step 179 is finished, the processing routine 170 terminates.

Thus, the submitted individual data is converted into shared data as a new layer and is managed.

Figure 20:
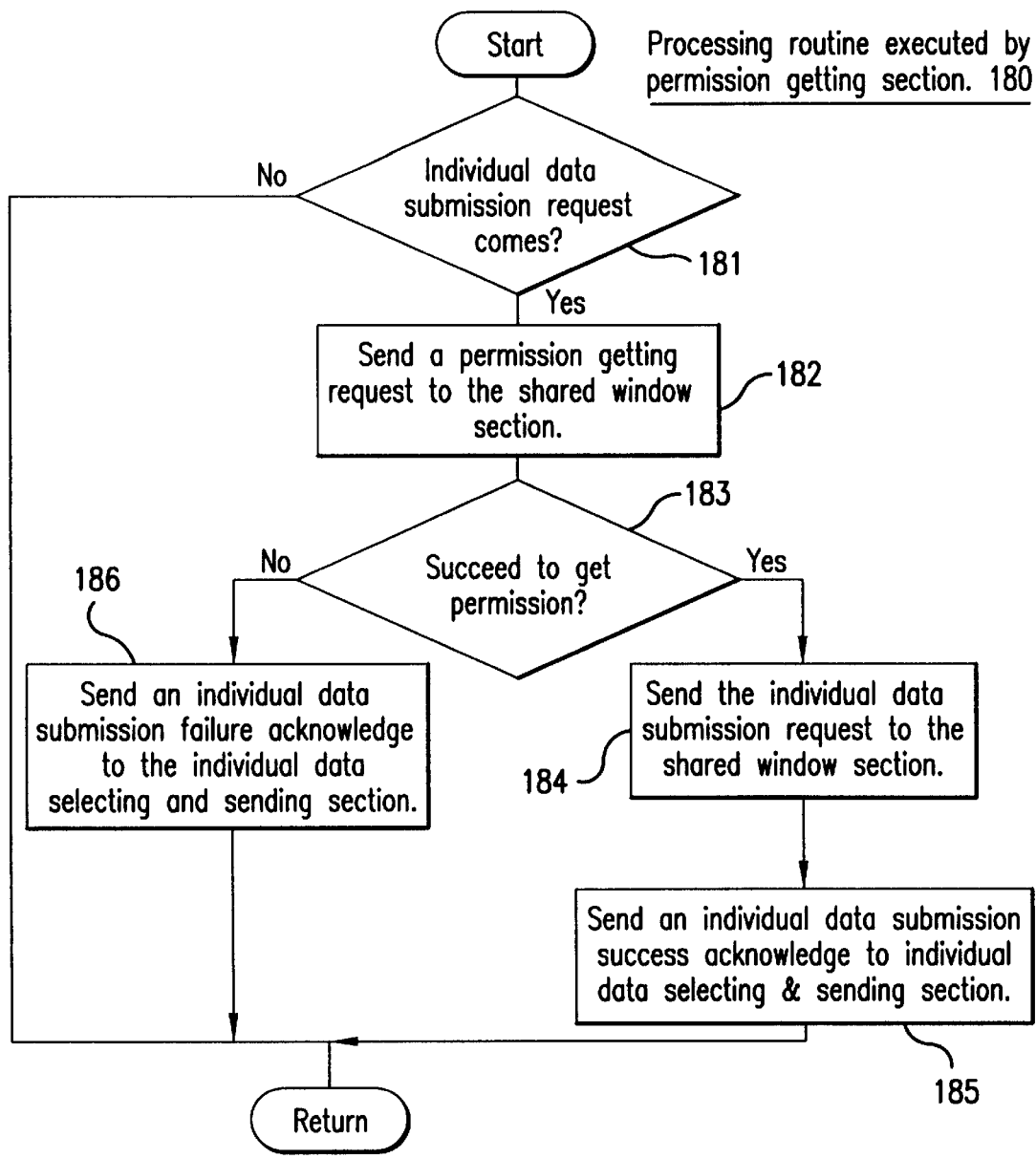
FIG. 20 is a flowchart illustrating an example of a processing routine executed by the mode selector.
Figure 21:
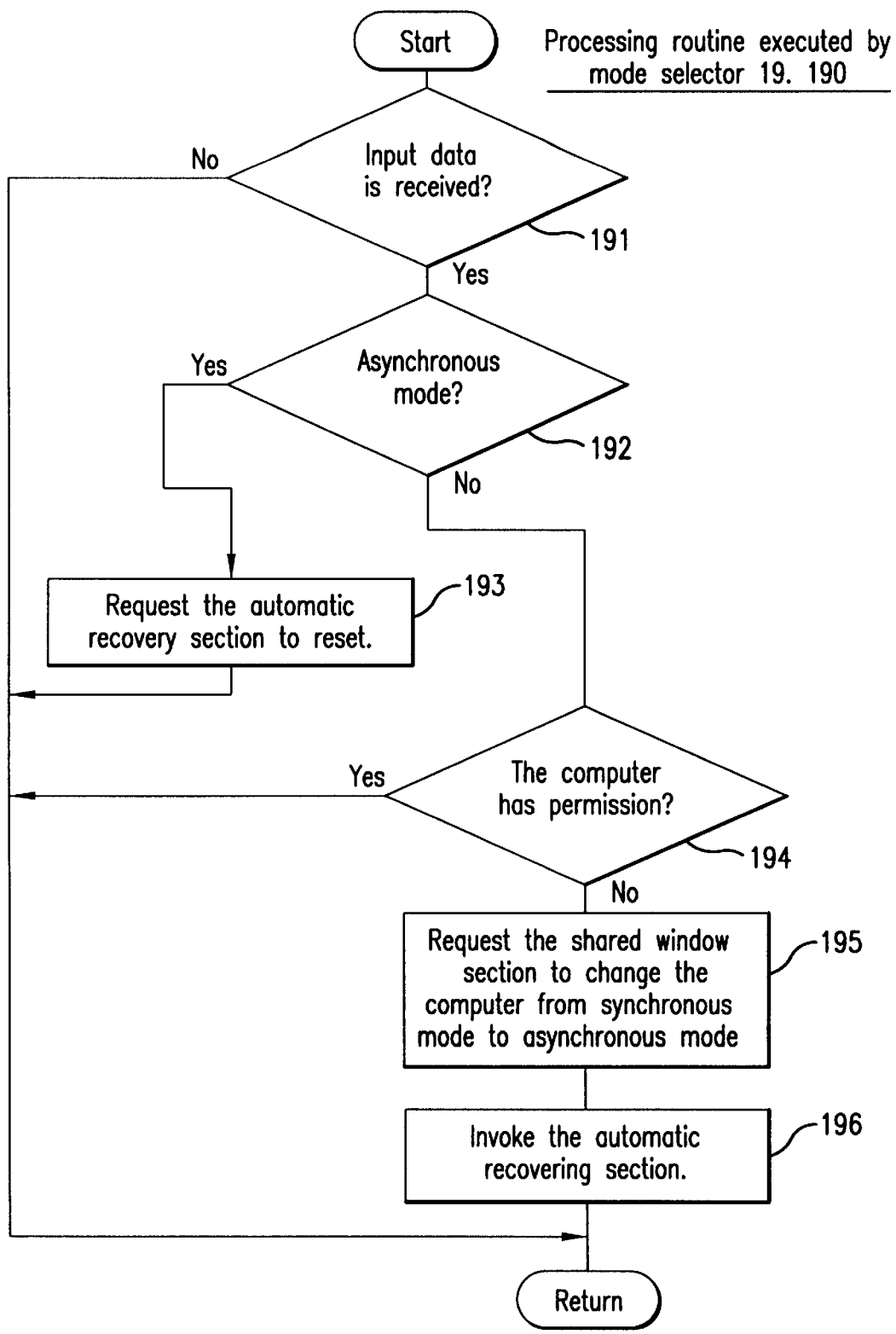
FIG. 21 is a flowchart illustrating an example of a processing routine executed by the automatic recovering section.

Next, a flowchart of the processing routine 180 shown in FIG. 20 is explained. The permission getting section 18 executes this processing routine when it receives the individual data submission request from the individual data selecting & sending section 17. In this embodiment, this processing routine 180 is also executed repeatedly at intervals of predetermined time.

In step 181, it is checked whether the individual data submission request comes from the individual data selecting & sending section 17. If it does not come, this processing routine 180 terminates. If it comes, the control proceeds to step 182. In step 182, the permission getting section sends a permission getting request to the shared window section 11.

The shared window section 11 returns a result indicating whether permission was gotten, to the permission getting section 18. Then, in step 183, the permission getting section 18 determines whether permission is gotten or not according to the result.

If it is determined in step 183 that permission is gotten, the control proceeds to step 184. In step 184, the permission getting section sends the individual data submission request to the other computers through the shared window section 11. Then, in step 185, an individual data submission success acknowledge is sent to the individual data selecting & sending 17. Then, this processing routine 180 terminates.

If it is determined that permission is not gotten in step 183, the control proceeds to step 186. In step 186, the permission getting section 18 sends an individual data submission failure acknowledge to the individual data selecting & sending section 17. Then, this processing routine 180 terminates.

Next, a flowchart of the processing routine 190 shown in FIG. 20, is explained. According to the processing routine 190, the mode selector 19 watches input data from the input section 12 and selects the synchronous mode or the asynchronous mode. In this embodiment, this processing routine 190 is also executed repeatedly at intervals of predetermined time.

In step 191, it is checked whether input data come from the input section 12 or not. If input data does not come, this processing routine 190 terminates. If input data comes, the control proceeds to step 192.

In step 192, it is checked whether the current mode of the computer is the synchronous mode or the asynchronous mode. If it is the asynchronous mode, the control proceeds to step 193. In step 193, the mode selector 19 sends a timer reset request to the automatic recovering section 20. Then, this processing routine 190 terminates.

If it is determined in step 192 that the current mode is synchronous mode, the control proceeds to step 194. In step 194, it is checked whether the computer presently has permission or not. If it has permission, this processing routine 190 terminates, since it is not necessary to change the mode.

If it is determined in step 194 that the computer presently has permission, the control proceeds to step 195. In step 195, the mode selector 19 requests the shared window section 11 to assign the asynchronous mode to the computer. Thus, the mode of the computer becomes the asynchronous mode, then the control proceeds to step 196. In step 196, the timer of the automatic recovering section 20 is invoked. After that, this processing routine 190 terminates.

Figure 22:
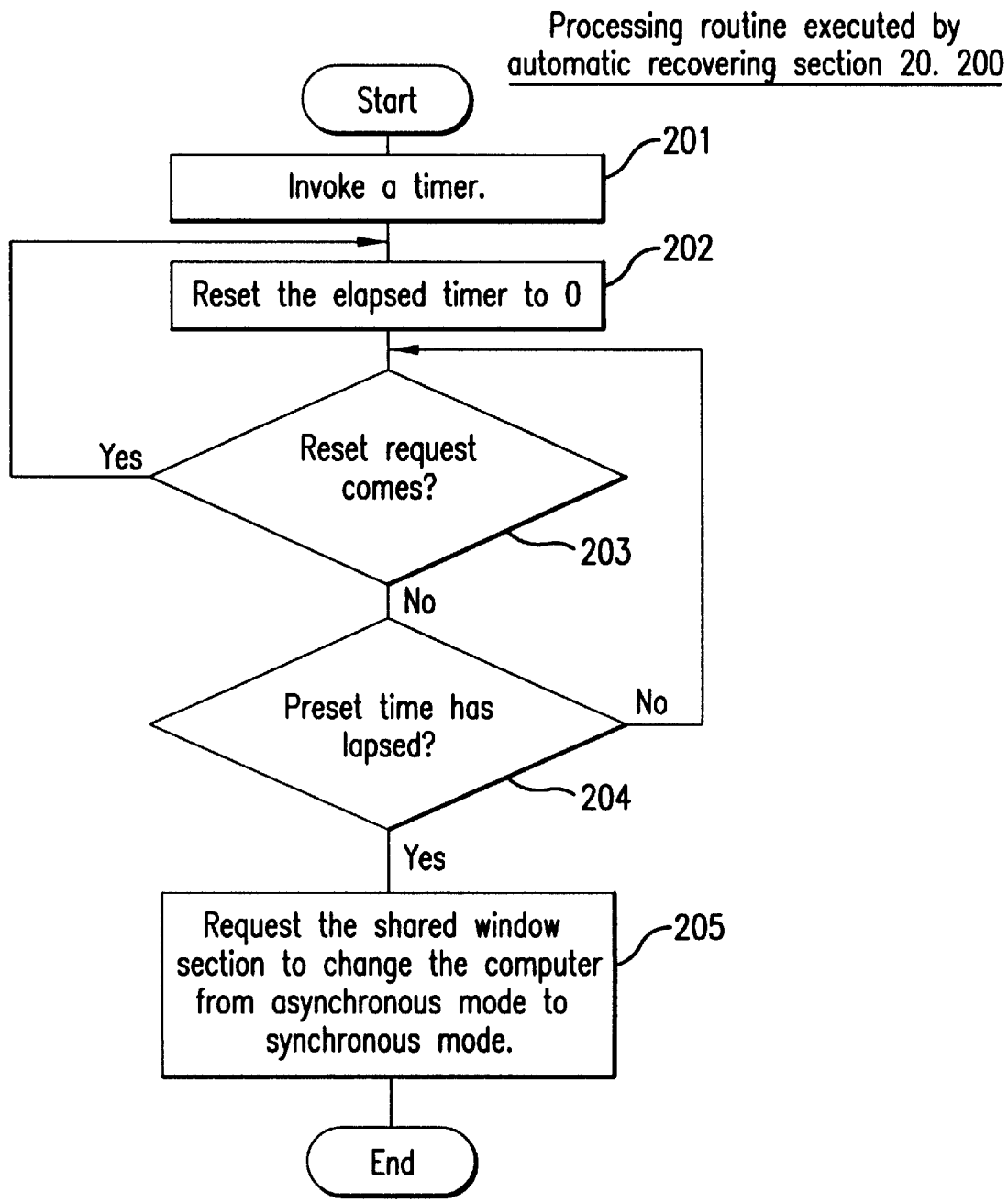
FIG. 22 is a flowchart illustrating an example of a processing routine executed by the permission getting section.

FIG. 22 is a flowchart of the processing routine 200 of the automatic recovering section 20. Next, this processing routine 200 is explained.

In step 201, the timer is invoked. In step 202, the elapsed time is reset to 0. In step 203, it is checked whether a reset request comes from the mode selector 19. If a reset request comes, the control returns to step 202 to reset the elapsed time to 0. If a reset request does not come, the control proceeds to step 204. In step 204, it is checked whether the preset time has lapsed or not. If the preset time has not lapsed, the control returns to step 203 so as to repeat the process following thereto.

If it is determined in step 204 that the preset time has lapsed, the control proceeds to step 205. In step 205, the automatic recovering section 20 sends a synchronous mode recovering request to the mode selector 19 so as to assign the synchronous mode to the computer to the synchronous mode again. Then, this processing routine 200 terminates.

When the mode selector 19 receives the synchronous mode recovering request sent in step 205, the mode selector 19 is prompted to execute a interruption process. In the interruption process, the mode selector 19 sends a mode change request to assign the synchronous mode to the computer to the shared window section 11.

When an mode change request (see FIG. 7) comes from the other personal computers through the shared window section 11, the mode selector 19 is interrupted in the same way, and executes processing to change the mode of a computer according to the mode change request.

Figure 23:
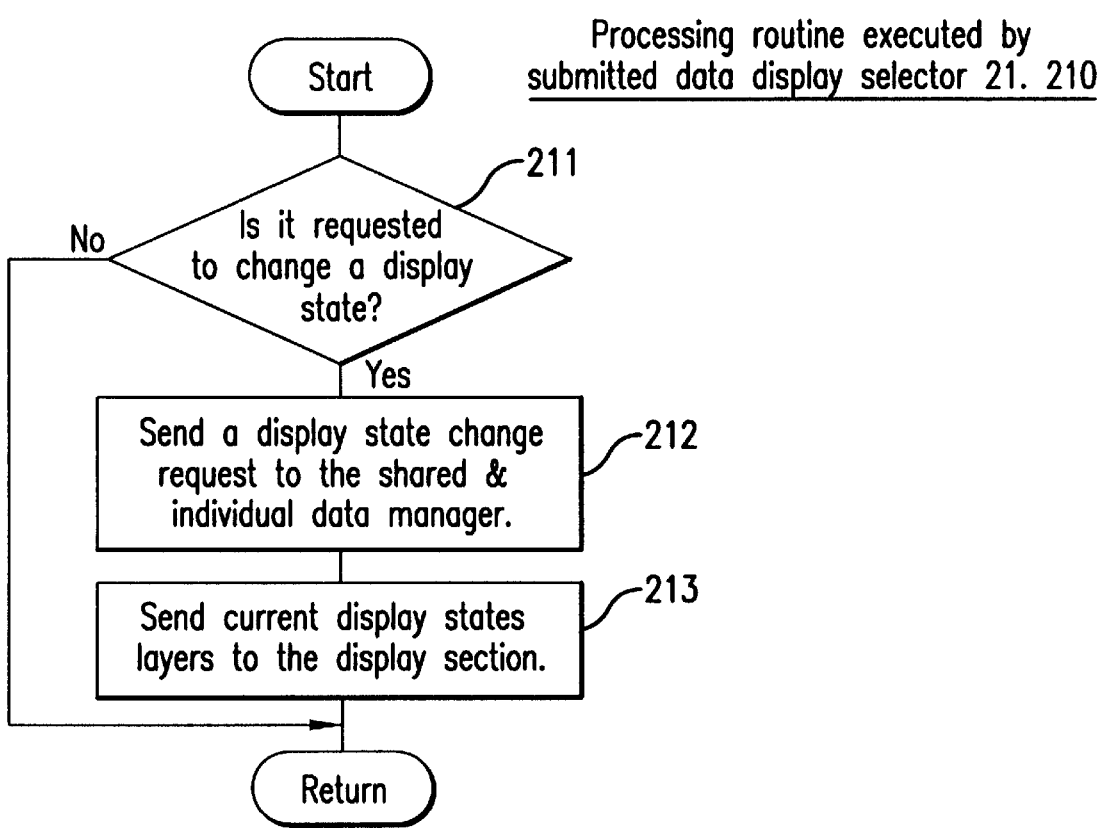
FIG. 23 is a flowchart illustrating an example of a processing routine executed by the submitted data display selector.

Next, a control processing routine executed by the submitted data display selector 21 is explained with reference to the flowchart shown in FIG. 23. In this embodiment, this processing routine 210 is also executed repeatedly at intervals of the predetermined time.

In step 211, it is checked whether it is requested to change a display state or not. If it is not requested, this processing routine 210 terminates. If it is requested, the control proceeds to step 212.

In step 212, a display state change request as shown in FIG. 8 is sent to the shared & individual data manager 16. In step 213, the display state of each layer in the displaying current page is sent to the display section 13. A display state means whether a layer is displayed or not Then this processing routine 210 terminates.

Figure 24:
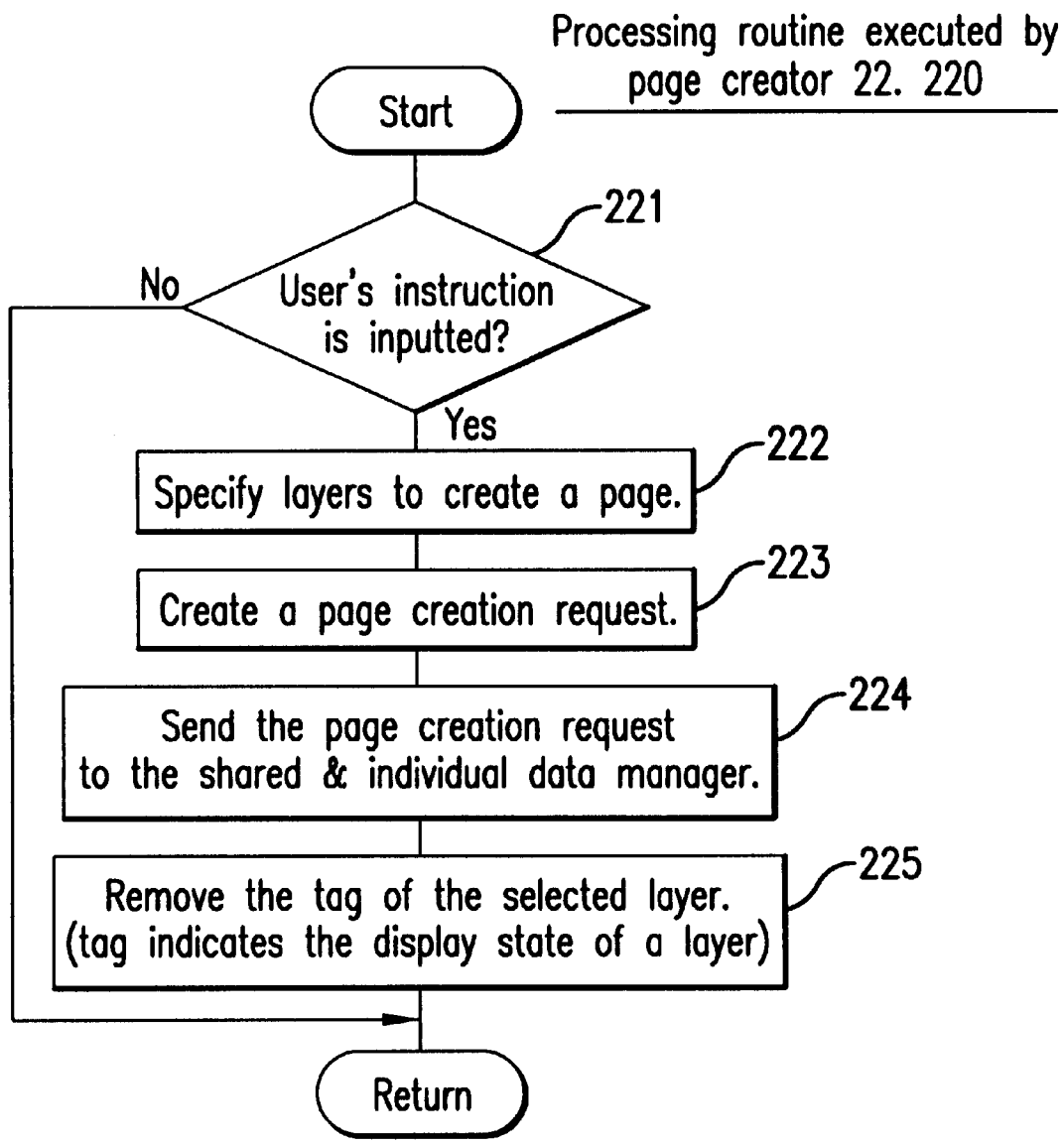
FIG. 24 is a flowchart illustrating an example of a processing routine executed by the page creator.

Next, control processing routine 220 of the page creator 22 is explained with reference to the flowchart shown in FIG. 24. In this embodiment, this processing routine 220 is also executed repeatedly at intervals of the predetermined time.

In step 221, it is checked whether the user inputs a page creation request or not. If a page creation request is not inputted, the processing routine 220 terminates. If a page creation request is inputted, the control proceeds to step 222.

In the step 222, plural layers from which a page is created are specified according to the inputted user's request. In this embodiment, a set of plural layers in the displayed current display layer, those are designated as "display" regarding the display state in the index data, is specified as the plural layers from which a page is created. For example, when the user designates an undesired page in the displayed current page as "undisplay" and inputs a page creation request, the layers whose display state are "display" are designated as layers from which a new page is created.

In step 223, a page creation request as shown in FIG. 9A is created by using the following data: "operator", which is an operator who submits the request; "PC (personal computer)", which identifies the personal computer, and the layers specified in step 222. In step 224, the created page creation request is sent to the shared & individual data manager 16. When the shared & individual data manager 16 receives the page creation request, the shared & individual data manager executes the processing routine corresponding to a page creation request as described above and sends the same page creation request is send to all the other personal computers.

Figure 30:
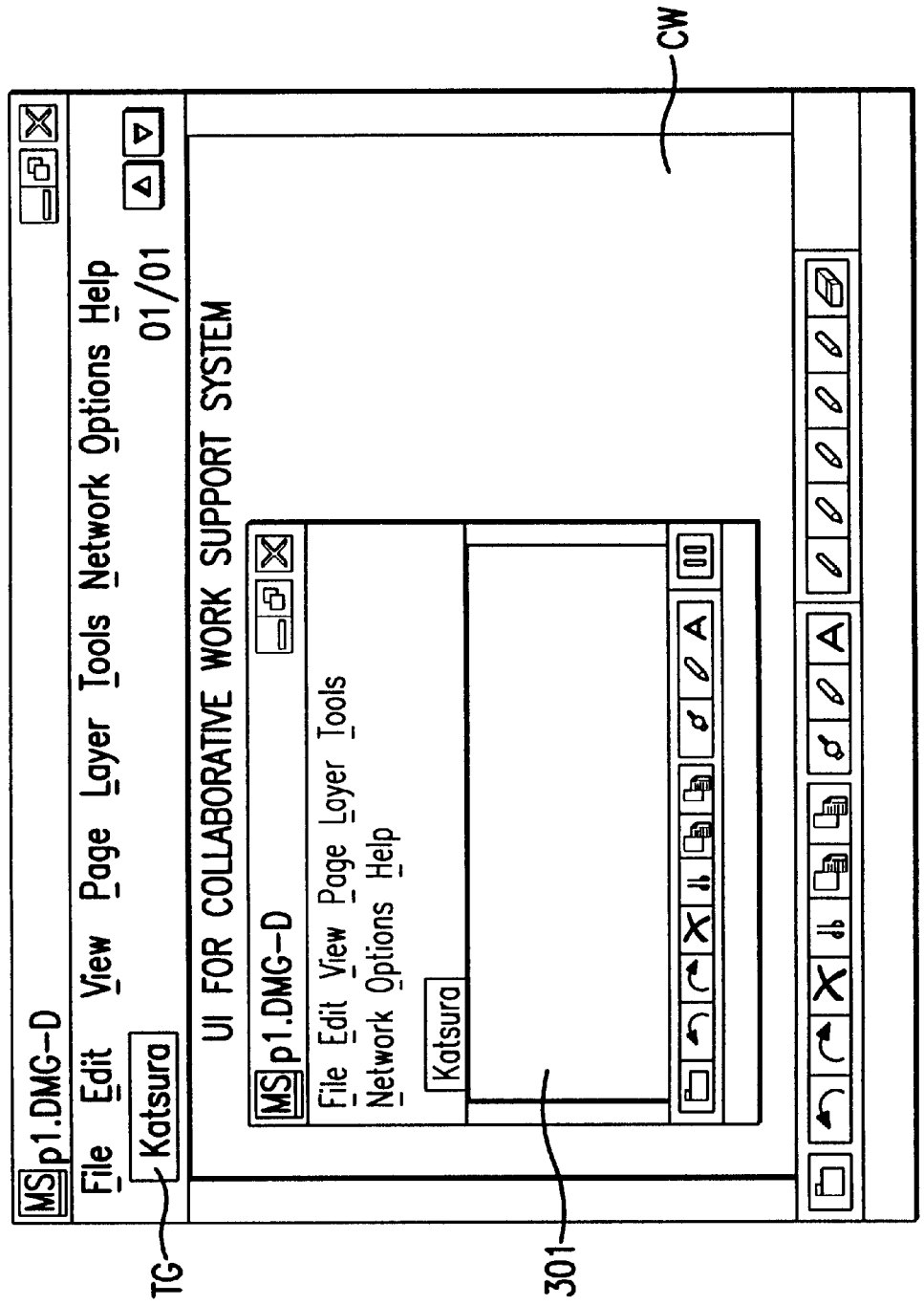
FIG. 30 shows an example of the screen image (immediately after the start of meeting) of the collaborative work support system of the firs embodiment.

In this embodiment, as shown in FIG. 30 explained later, a tag TG, which indicates a name of layer for showing the display state of each layer in the displaying current page, is displayed on the frame of the shared window CW. In step 225, the tag of the layer that was deleted for making a new page is removed from the frame of the shared window, since the deleted layers do not exist in the new page. Then, the processing routine 220 terminates.

As described above, in this embodiment, a set of plural layers in the current display page, those are designated as "display" regarding the display state in the index data, is designated as the plural layers from which a page is created. However, the other methods can be used. For example, the user can explicitly designate the layers to be a page. Also the layers including objects that is retrieved according to a retrieving condition can be designated. The following retrieving condition can be used: a layer having an object written in red; a layer having an object that includes "conclusion" as an attribute; or a layer having a text object that includes a particular word.

Figure 25:
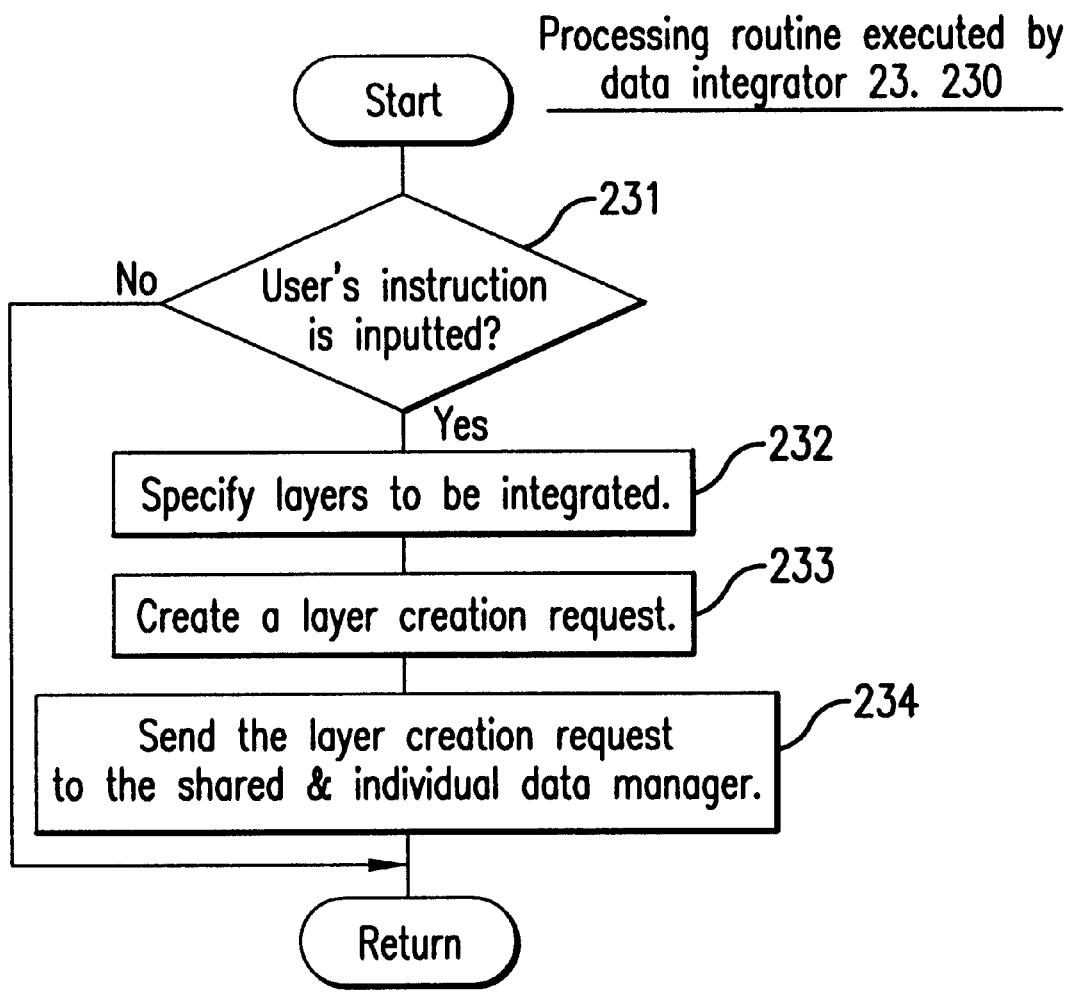
FIG. 25 is a flowchart illustrating an example of a processing routine executed by the writing layer selector.

Next, a control processing routine 230 executed by the data integrator 23 is explained with reference to the flowchart shown in FIG. 25. In this embodiment, this processing routine 230 is also executed repeatedly at intervals of the predetermined time.

In step 231, it is checked whether instruction of layer creation is inputted from the user or not. If the instruction is not inputted, the processing routine 230 terminates. If the instruction is inputted, the control proceeds to step 232.

In step 232, in this embodiment, a layer is specified by the same method as what is used in the page creation described above. That is, the user designates the plural layers to be integrated into a new layer in the displaying current layer as "display" regarding the display state. Then, when the user instructs to create a layer, the layers that are designated as "display" in the page are specified as the layers to be integrated.

In step 233, a layer creation request shown in FIG. 11 is created by using the following data: "operator", which is a user who submits the request; "PC (personal computer)", which identifies the personal computer; and the layers specified in step 232. Then, in step 234, the created layer creation request is sent to the shared & individual data manager 16. When the shared & individual data manager 16 receives the layer creation request, it executes processing corresponding to a layer creation request as described above and sends the same layer creation request to all the other personal computers. Then, this processing routine 230 terminates.

Figure 26:
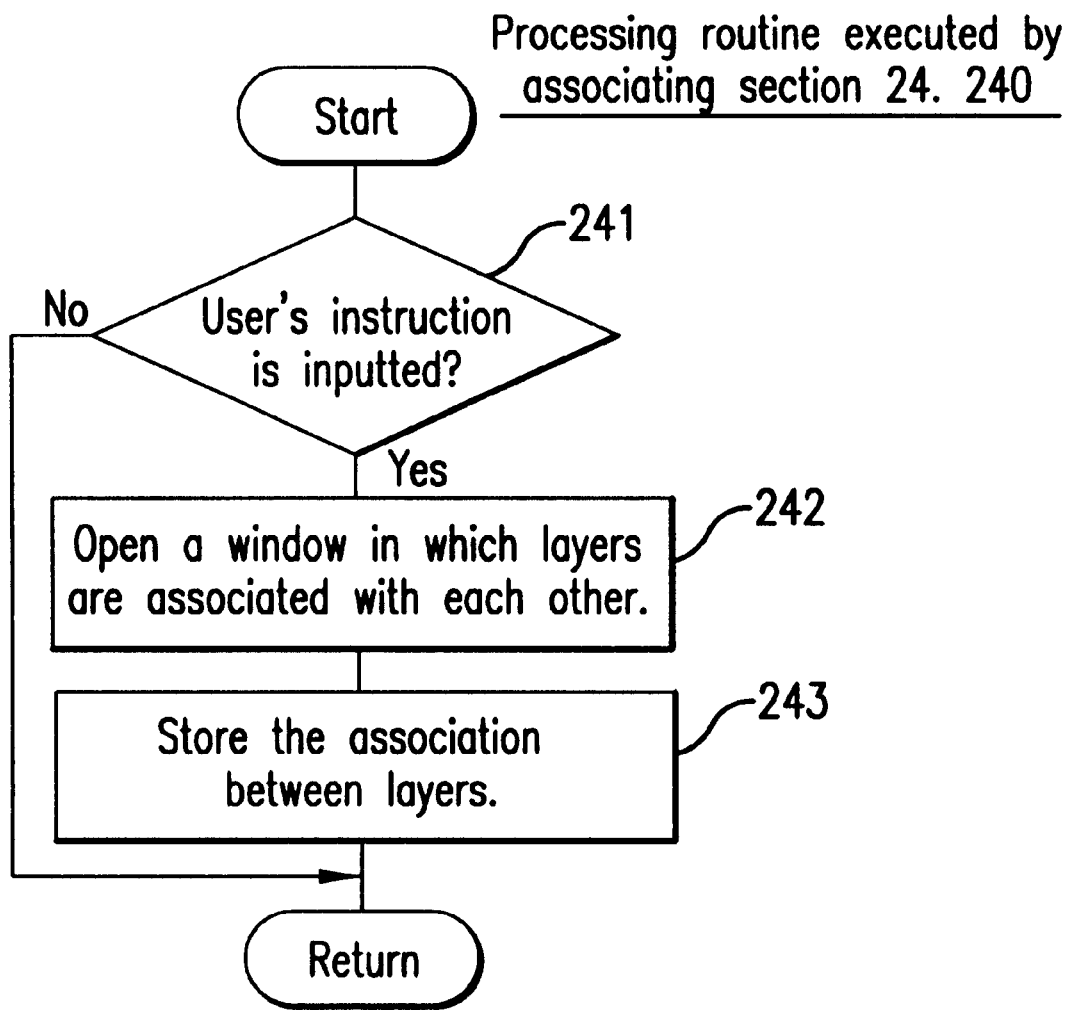
FIG. 26 is a flowchart illustrating an example of a processing routine executed by the data integrator.

Next, a control processing routine 240 executed by the associating section 24 is explained with reference to the flowchart shown in FIG. 26. In this embodiment, this processing routine 240 is also executed repeatedly at intervals of the predetermined time.

In step 241, it is checked whether an instruction to associate layers with each other is inputted from the user or not. If the instruction is not inputted, the processing routine 240 terminates. If the instruction is inputted, the control proceeds to step 242.

In step 242, a window to associate layers with each other is opened. In this window, the above-described process to associate layers with each other is performed. After the process to associate layers with each other, in step 243, the association between layers is stored in a form shown in FIG. 5. Then, the processing routine 240 terminates.

Figure 27:
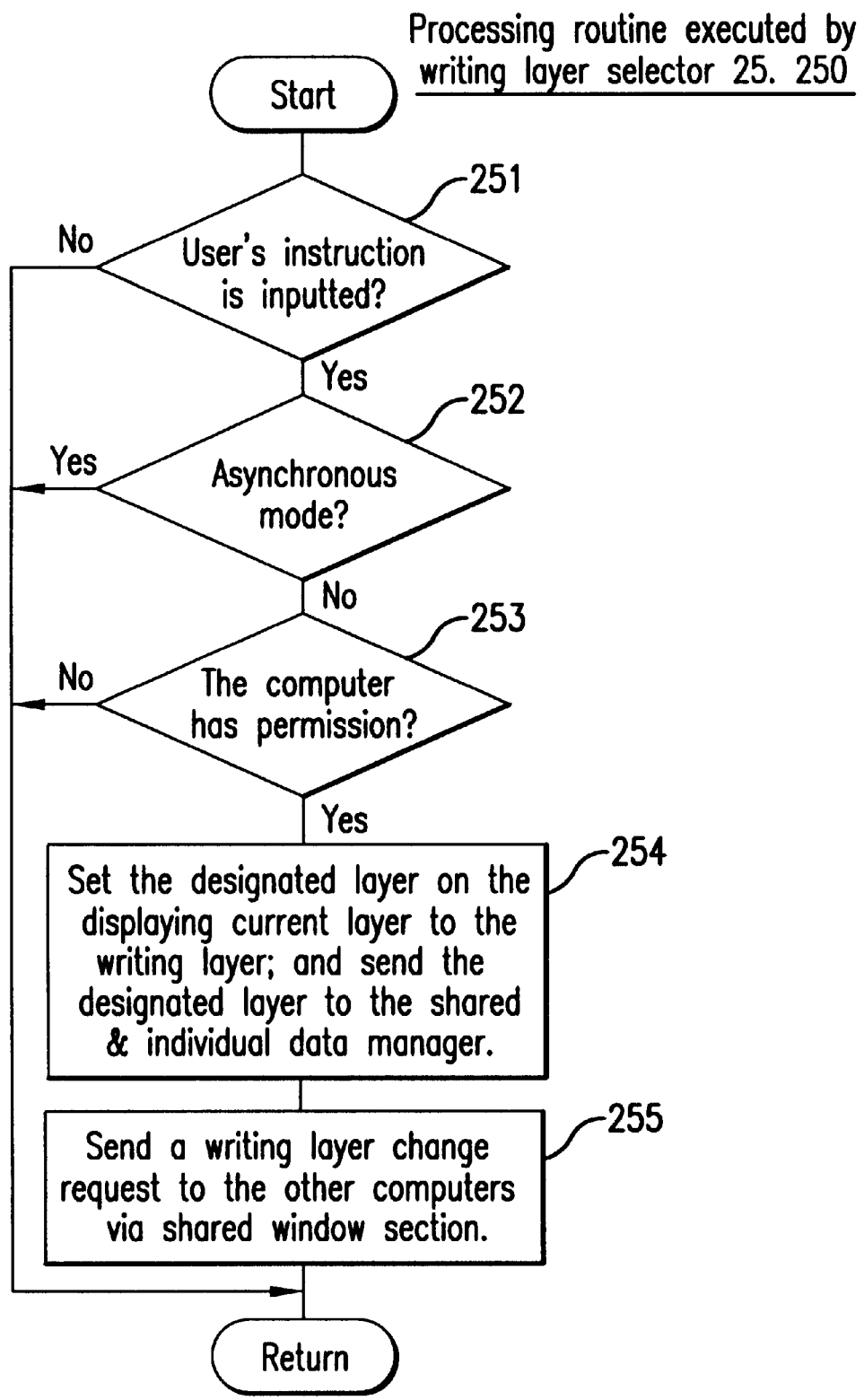
FIG. 27 is a flowchart illustrating an example of a processing routine executed by the associating section.

Next, a control processing routine 250 executed by the writing layer selector 25 is explained with reference to the flowchart shown in FIG. 27. In this embodiment, this processing routine 250 is also executed repeatedly at intervals of the predetermined time.

In step 251, it is checked whether the user inputs an instruction to select a writing layer. If it is not inputted, this processing routine 250 terminates. If it is inputted, the control proceeds to step 252.

In step 252, it is checked whether the mode of the computer is the asynchronous mode. If it is the asynchronous mode, the user's instruction to select a writing layer is ignored, and this processing routine 250 terminates.

If it is determined in step 252 that the mode of the computer is the synchronous mode, the control proceeds to step 253. In step 253, it is checked whether the computer has permission or not. If it does not have permission, the user's instruction to select a writing layer is ignored and this processing routine terminates, that is the next user's instruction to select a writing layer is waited. If it has permission, the control proceeds to step 254.

In step 254, a selected layer selected by the user in the displaying current page is specified as a writing layer, and the specified layer is sent to the shared & individual data manager 16 in a form of the writing layer change request shown in FIG. 10A. Then, the control proceeds to step 255. In step 255, the writing layer change request is sent to the other computers via the shared window 11, and this processing routine 250 terminates.

Figure 28:
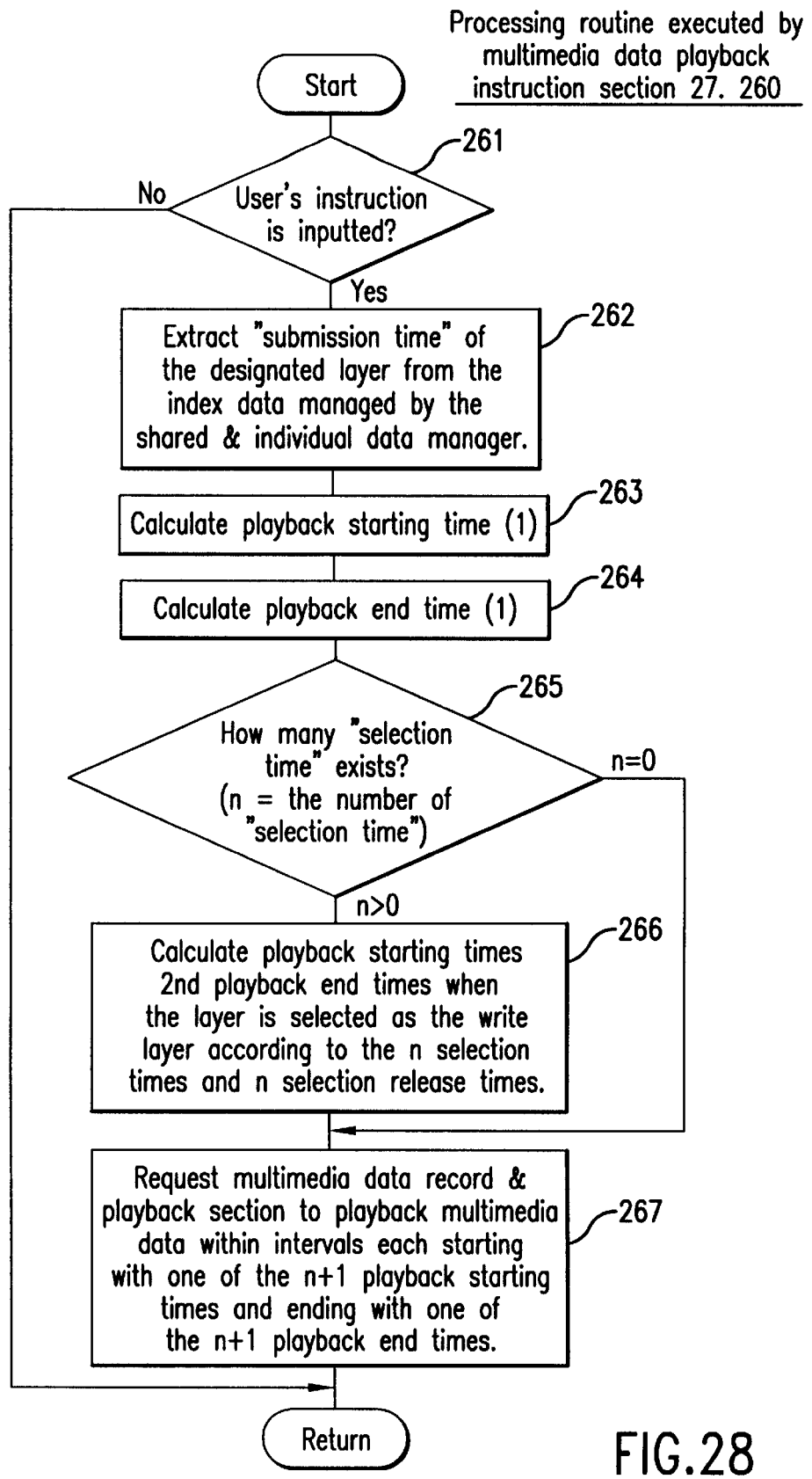
FIG. 28 is a flowchart illustrating an example of a processing routine executed by the multimedia data playback instruction section.

FIG. 28 shows a flowchart of the processing routine 260 executed by the multimedia data playback instruction section 28. In this embodiment, this processing routine 260 is also executed repeatedly at intervals of the predetermined time.

In step 261, it is checked whether the user inputs an instruction to play back multimedia data. If it is not inputted, this processing routine 260 terminates. If it is inputted, the control proceeds to step 262. In step 262, the submission time of the specified layer is extracted from the index data managed by the shared & individual data manager 16. Then, the control proceeds to step 263. In step 263, the playback starting time (1) is calculated. The playback starting time (1) is an initial value of playback starting time (i) (i=1, 2, . . . , n+1), to the number of n+1, described later, and is calculated by the following expression:

playback starting time (1)=[submission time]–[the time when the multimedia data record & playback section 27 is invoked]

Next, in step 264, the playback end time (1) is calculated. The playback end time (1) is an initial value of playback end time (i) (i=1, 2, . . . , n+1), to the number of n+1, described later, and is calculated by the following expression:

Playback end time (1)=[selection release time (1)]–[the time when the multimedia data record & playback section 27 is invoked]

The selection release time (1) is the first data item of the "selection release time" of the specified layer in the index data managed by the shared & individual data manager 16.

Next, in step 265, the number of data items included in "selection time" of the specified layer is counted in accordance with the index data managed by the shared & individual data manager 16. If there is no data item in "selection time", there is only one data item in "selection release time". Thus, there are single playback starting time and single playback end time. Therefore, the control proceeds to step 267. In this case, the multimedia data playback instruction section 28 requests the multimedia data record & playback section 27 to play back the recorded data within the interval starting with the playback starting time (1) calculated in step 263 and ending with the playback end time (1) calculated in step 264.

If it is determined in step 265 that there is at least one item in "selection time" of the specified layer, "selection release time" has plural items. Thus, there are plural playback starting times and playback end times. Therefore, the control proceeds to step 266 to calculate the plural starting times and playback end times.

In step 266, plural playback starting time and playback end time of the plural intervals when the layer is designated as the writing layer are calculated by using the n selection times and n+1 selection release times. They are calculated by repeating the following expression from m=1 to m=n:

Playback starting time (m+1)=[selection time (m)]−[the time when the multimedia data record & playback section 27 is invoked]

Playback end time (m+1)=[selection release time (m+1)]−[the time when the multimedia data record & playback section 27 is invoked]

After the calculation of step 266, the control proceeds to step 267. In this case, the multimedia data playback instruction section 28 requests the multimedia data record & playback section 27 to play back the recorded data within the interval starting with each of the plural playback starting times and ending with each of the plural playback starting times calculated in step 266. After the process in step 267, this processing routine 260 terminates.

Figure 29:
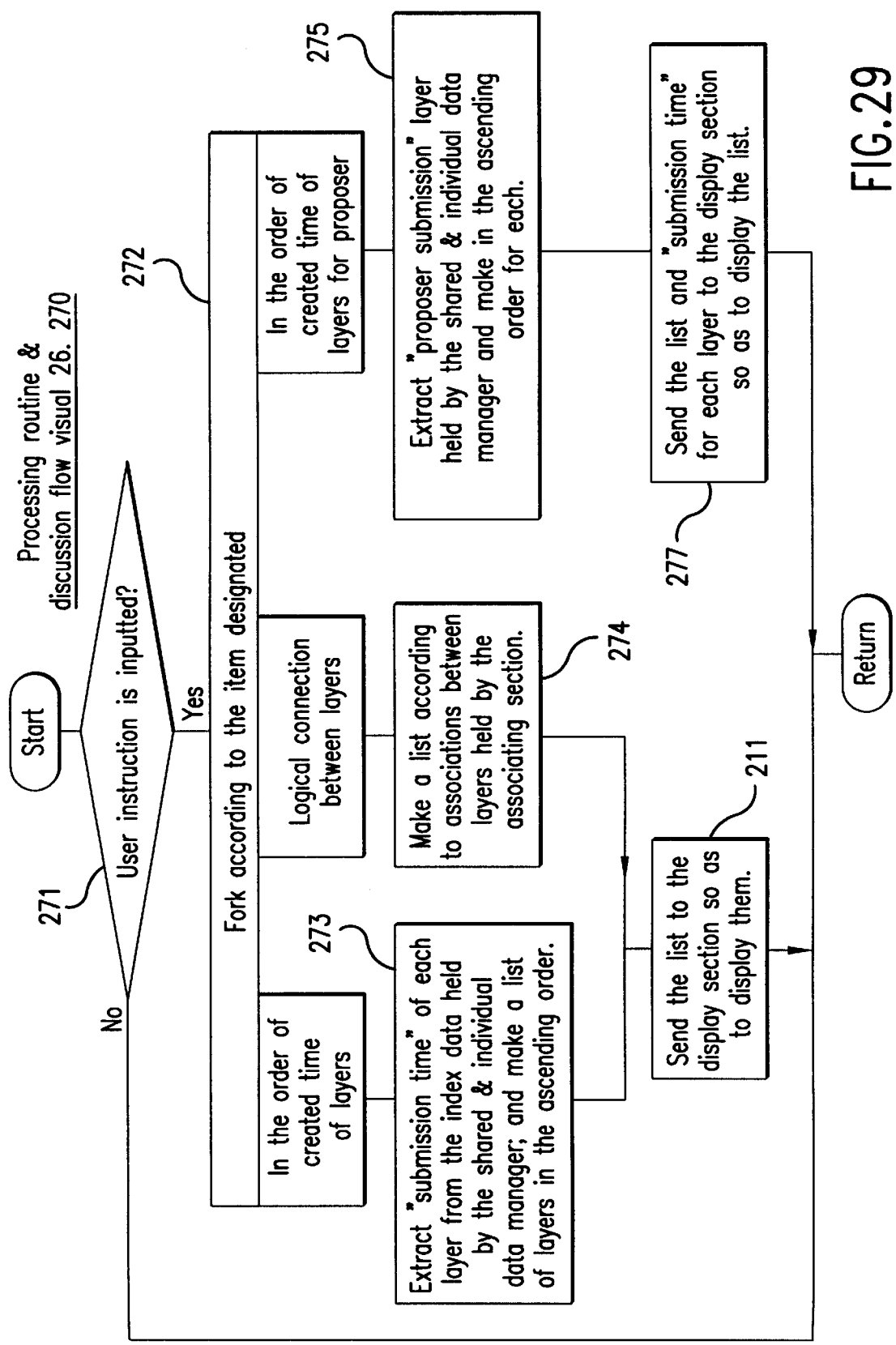
FIG. 29 is a flowchart illustrating an example of a processing routine executed by the discussion flow visualizing section.

FIG. 29 shows a flowchart of the processing routine 270 executed by the discussion flow visualizing section 26. Next, this processing routine 270 is explained. In this embodiment, this processing routine 270 is also executed repeatedly at intervals of the predetermined time.

In step 271, it is checked whether the user inputs an instruction to visualize discussion flow. If it is not inputted, this processing routine 270 terminates. If it is inputted, the control proceeds to step 272.

In step 272, the control forks according to the items the user designates. In this embodiment, the user can designate the following three items: display of layers in the order of created time of layers; display of logical connection between layers according to the association given by the associating section 24; and display of layers in the order of the created time of layers for each proposer.

If the user requests to display an order of layers' creation in step 272, the control proceeds to step 273. In step 273, a list of layers which are sorted in an ascending order of the submission time in the index data managed by the shared & individual data manager 16 is created. For example, when Pi (i=1, 2, . . . ) and Lj represent page No. and layer No., respectively, and the layer Lj in the page Pi is represented as (Pi, Lj), the list is represented such as "(P1, L1), (P1, L2), (P1, L3), (P2, L1), (P2, L2)".

In step 272, the user requests to display a logical connection between layers according to the association given by the associating section 24, the control proceeds to step 274. In step 274, a list of logical connections between specified layers is created according to the association between layers shown in FIG. 5. When a logical connection between two layers is represented as ((Pi, Lj), (Pk, Lm)), an example of the list is :[(P1, L1), (((P1, L2) , ((P1, L4) , (P1, L5))), (P1, L3))); ((P2, L1), ((P2, L2), (P2, L3))); ((P3, L1), ((P1, L2), (P1, L3)));]

If the user requests to display an order of layers' creation for each proposer in step 272, the control proceeds to step 275. In step 275, a list of layers sorted in an ascending order of the submission time in the index data managed by the shared & individual data manager 16 is created for each person.

The list consists of a proposer and data that identify an layer, for example:[(Katsura, ((P1, L1), (P2, L2))); (Ichimura, (P1, L2)); (Hayashi, (P1, L3));]

After steps 273 and 274, the control proceeds to step 276, where the created list is displayed on the display 12. After step 275, the control proceeds to step 277. In step 277, the created list and the submission times of specified layers are sent to the display 12 and are displayed thereon. After steps 276 or 277, this processing routine 270 terminates.

Next, some examples of the screen images of the shared window CW, which are displayed on the display of a personal computer in the embodiment of the collaborative work support system described above are explained.

FIG. 30 shows an example of a screen image immediately after the beginning of a meeting in this embodiment of the collaborative work support system. This example of the screen image is displayed when Katsura submits an example of a window design 301 to the shared window CW so as to start discussion on a design of a shared window that is a user interface of a collaborative support system. In such case, a tag TG of the displayed layer indicating the proposer is displayed around the menu of the shared window CW. In this case, the tag TG including "Katsura" is displayed.

Figure 31:
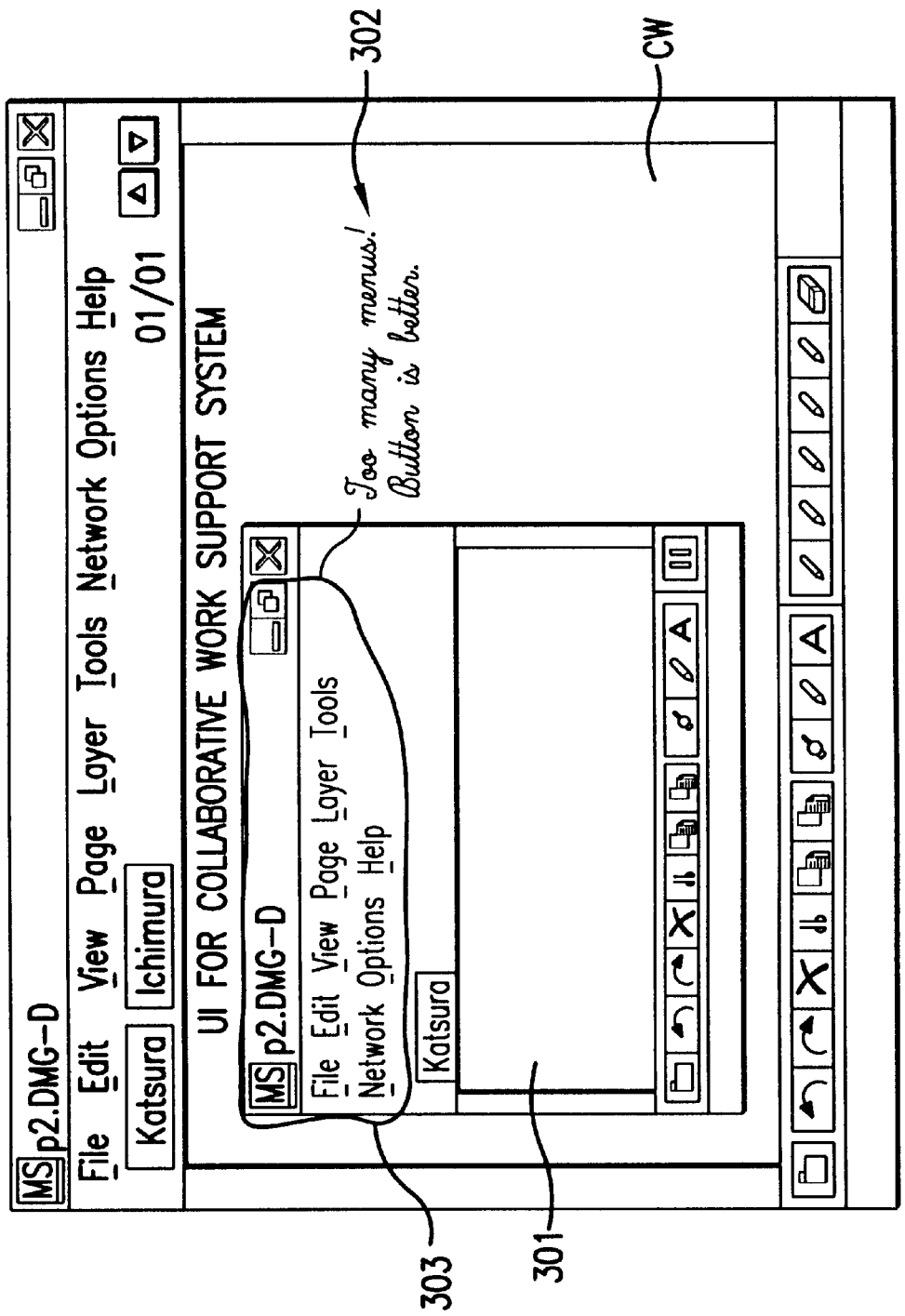
FIGS. 31, 32, 33 and 34 show an example of the screen image of the collaborative work support system of the firs embodiment.

FIG. 31 shows an example of the screen displayed on the shared window CW after another participant (Ichimura) submits sentences of his opinion by using an individual data submission request. The sentences have been written while seeing the screen of the shared window CW shown in FIG. 30. In this case, string 302, which is the opinion submitted by Ichimura, and stroke line 303, which is an instructing operation corresponding to the string 302, are displayed on the screen.

Then, a new layer, which is a set of opinions included in the individual data at the time of submission, is created and managed as shared data. In the screen, a tag "Ichimura" is also displayed around the menu of the shared window CW so as to show that the layer of "Ichimura" exists. This screen is made of the layers of "Katsura" and "Ichimura", which constitute a page.

Figure 32:
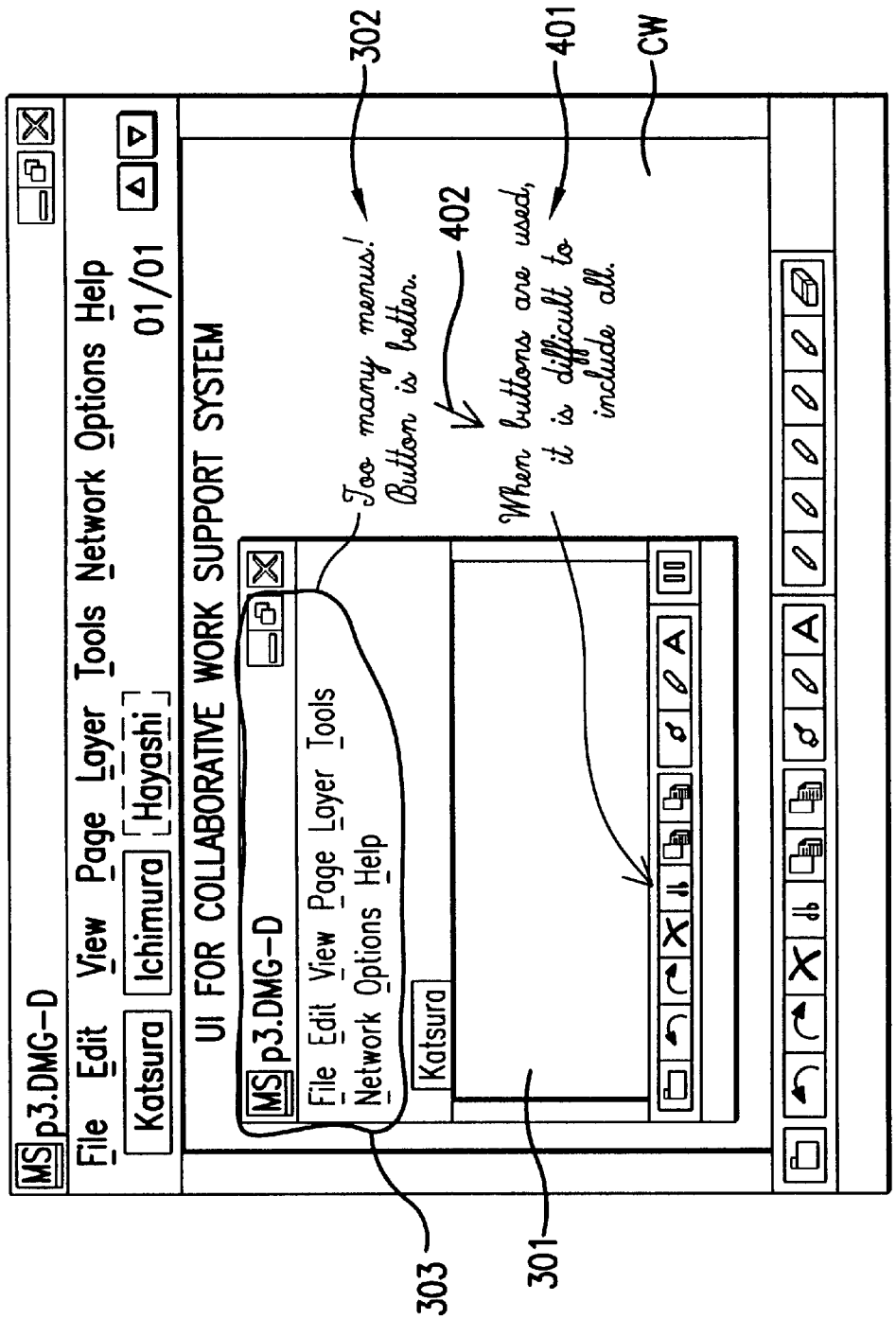

FIG. 32 shows an example of the screen during the discussion on the menu of the window with reference to the Ichimura's opinion submitted in FIG. 31. String 401, "when buttons are used, it is difficult to include all", and arrow stroke 402 are managed as data included in the layer of "Ichimura", despite they are newly written during the discussion.

In FIG. 32, tag "Hayashi" drawn by a dashed line indicates that a participant Hayashi, who does not participate in the discussion now, writes his opinion as individual data into the shared screen CW on his personal computer. Since this opinion of Hayashi has not been submitted yet to be the shared data, it is not displayed on the screen shown in FIG. 32.

Figure 33:
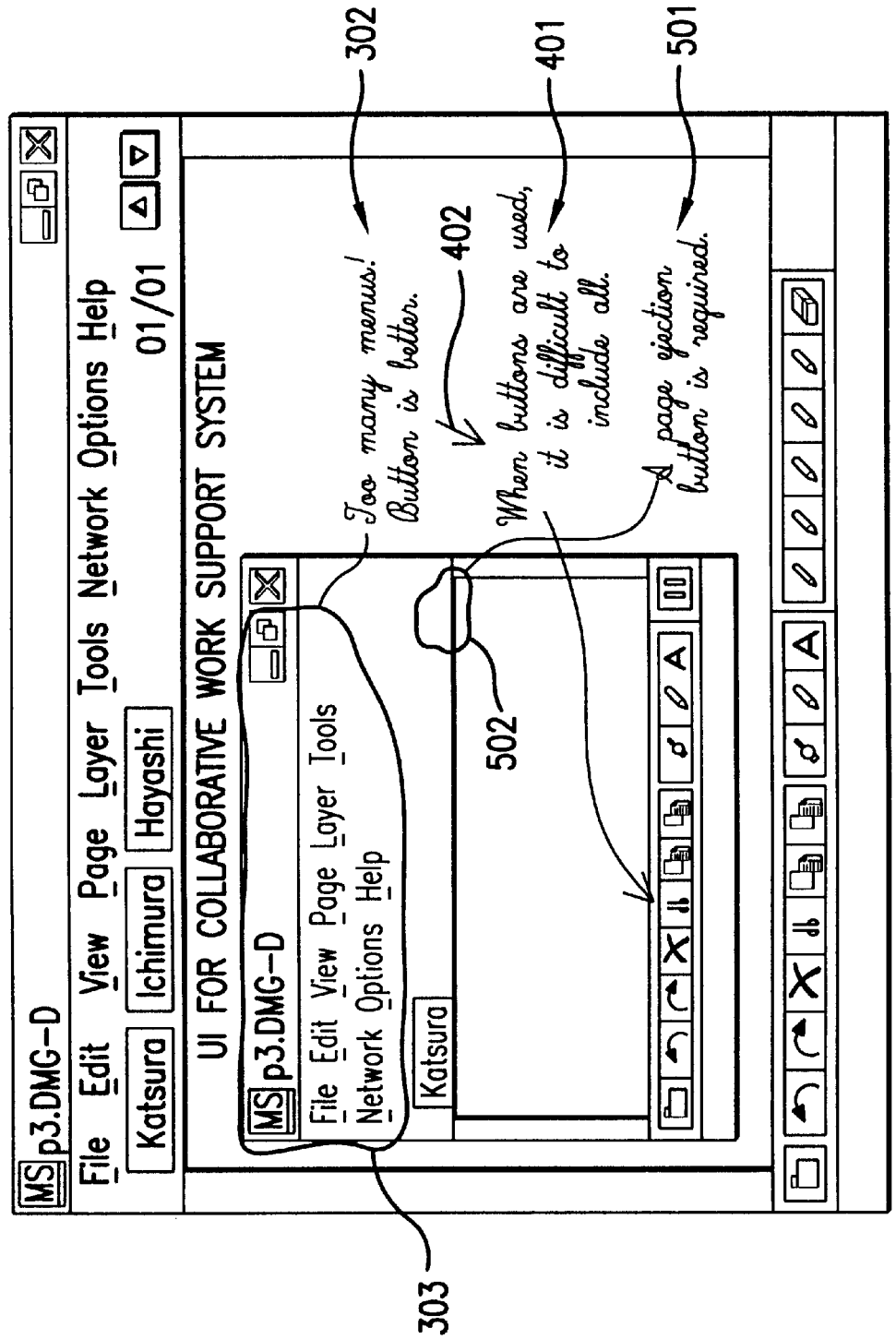

FIG. 33 shows an example of the screen when Hayashi submits the opinion that has been written as individual data during the discussion on menu in pauses of the discussion. In this case, a new layer, which is a set of opinions associated with the individual data at the time of submission, is created and managed as shared data. In the screen, a tag "Hayashi" is explicitly displayed around the menu of the shared window CW so as to show that the layer of "Hayashi" exists. This screen shown in FIG. 33 is made of the three layers constituting a page. String 501 "A page ejection button is required" and stroke 502 are the objects written by Hayashi.

Figure 34:
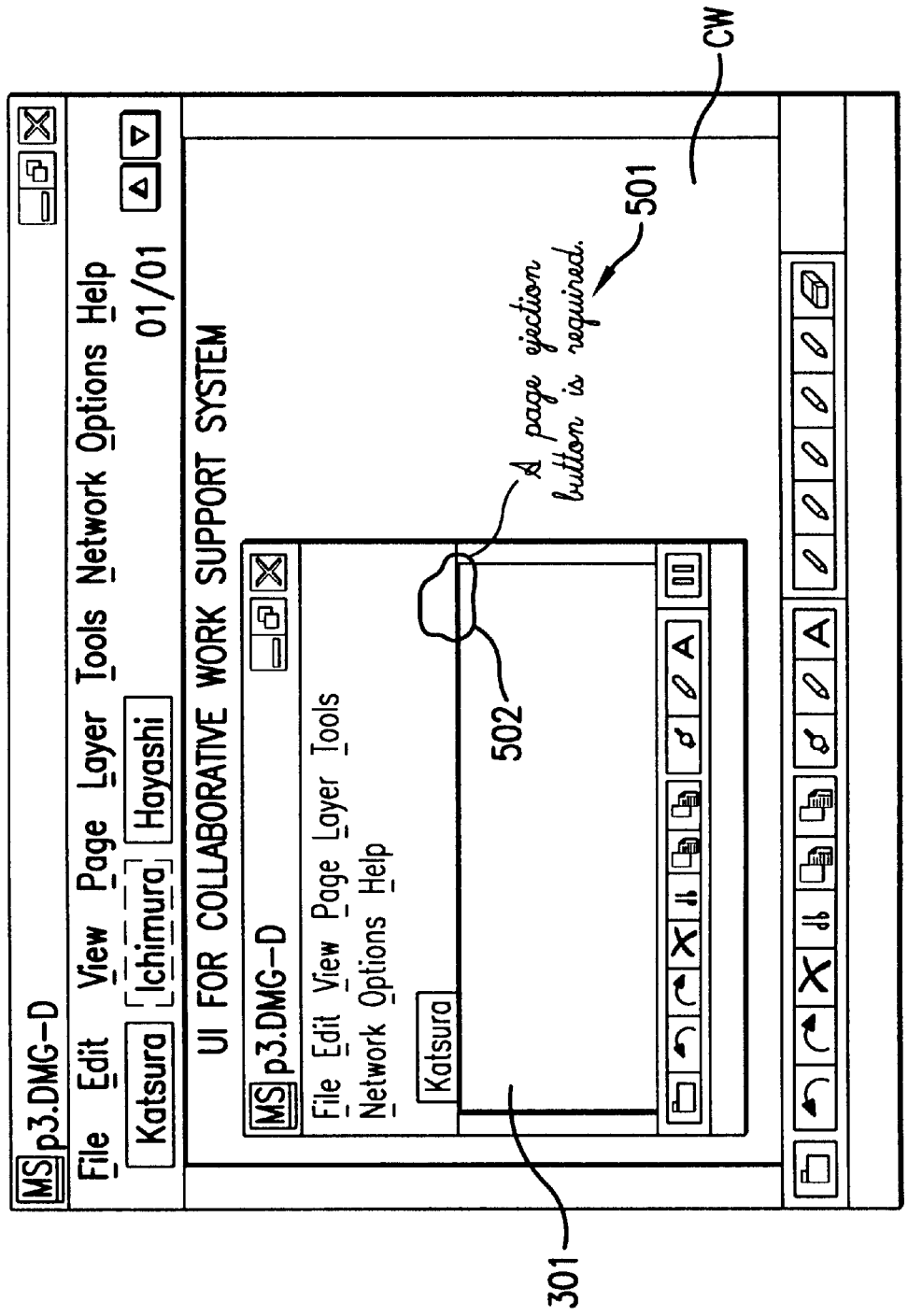

The screen shown in FIG. 33 includes the following two points in question, i.e. a menu and a button of page ejection. FIG. 34 shows an example of the screen in which the layer "Ichimura", which is a set of opinions regarding the first point in question (menu), is not displayed. At this time, the tag of undisplayed layer "Ichimura" is displayed in shading (drawn by a dashed line in the figure).

Figure 35:
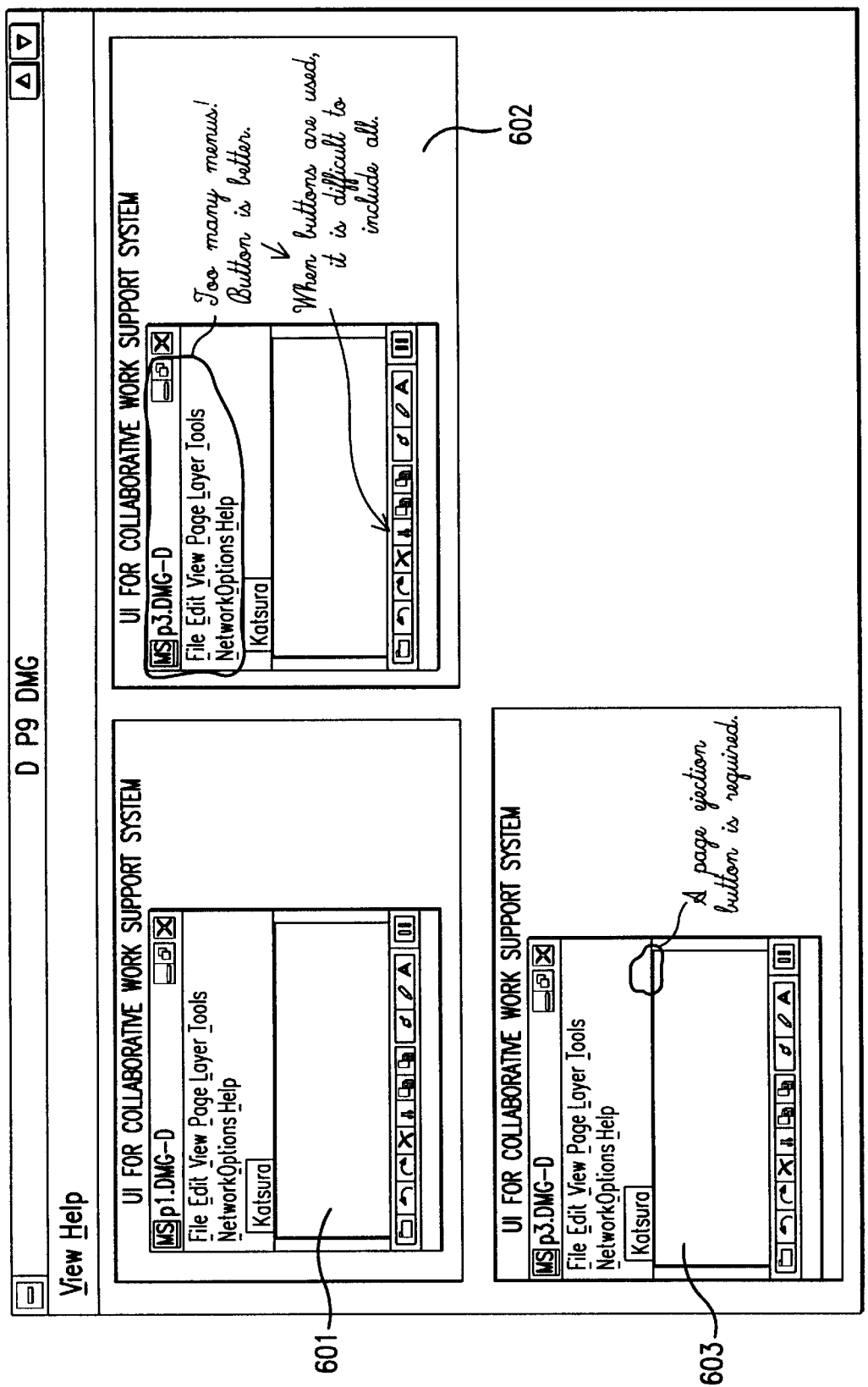
FIG. 35 shows an example of the screen image (displaying in the order of creation of layers) of the collaborative work support system of the firs embodiment.

FIG. 35 shows an example of the screen image in which layers arranged in the order of submission time are displayed by the discussion flow visualizing section 26 according to the processing routine of the flowchart shown in FIG. 29. In this example of the screen, layer "Katsura" 601, layer "Ichimura" 602 and layer "Hayashi" 603 are arranged in this order.

Figure 36:
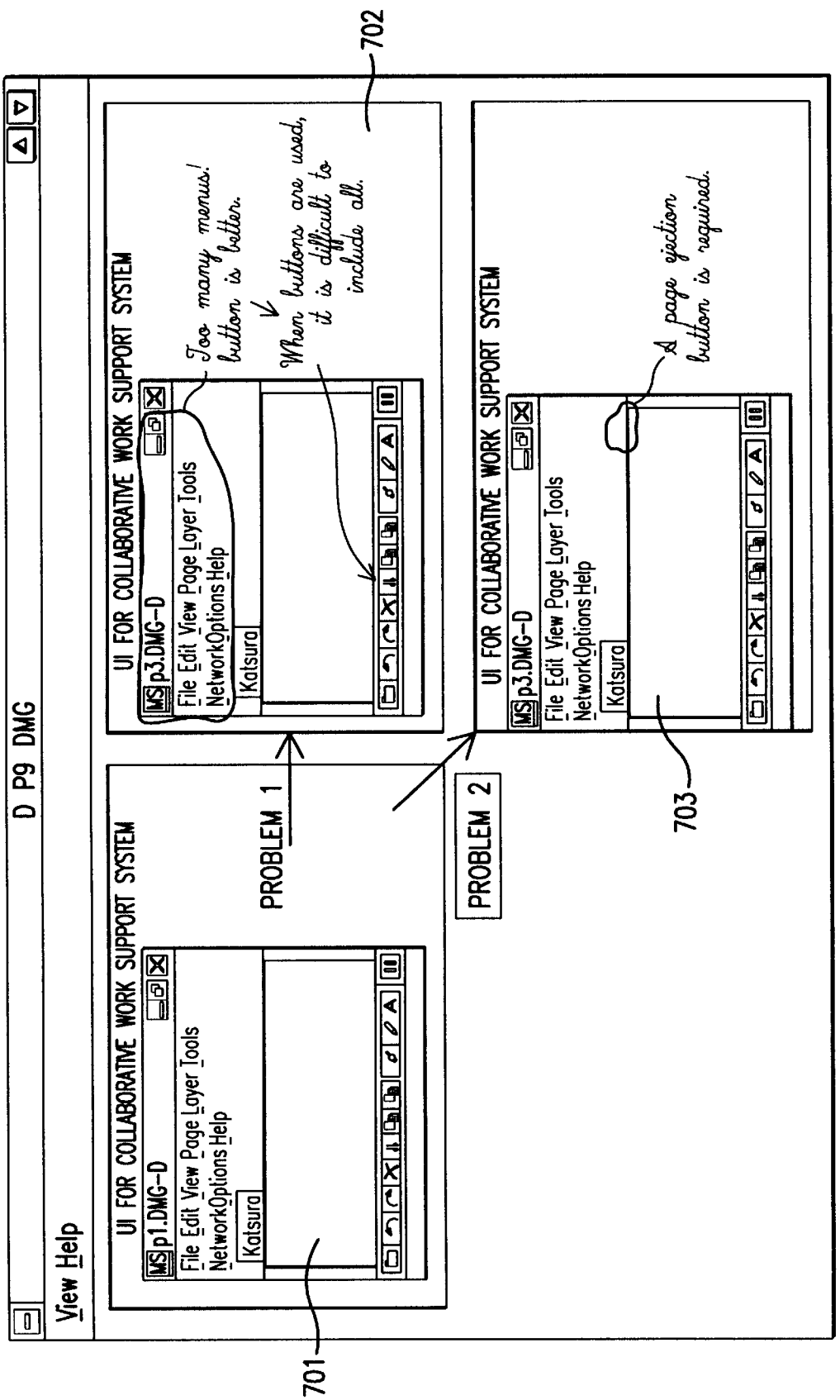
FIG. 36 shows an example of the screen image (displaying the relationships between layers) of the collaborative work support system of the firs embodiment.

FIG. 36 shows an example of the screen in which a logical connection between layers is displayed by the discussion flow visualizing section 26 according to the processing routine of the flowchart shown in FIG. 29. In this example of the screen shown in FIG. 36, layer "Katsura" 701 is connected with layer "Ichimura" 702 by "problem 1", and layer "Katsura" 701 is connected with layer "Hayashi" 703 by "problem 2".

As described above, the embodiment of the collaborative work support system of the present invention is provided with the individual data memory 15, the shared & individual data manager 16 and individual data selecting & sending section 17. Therefore, opinions as shared data given on a submitted individual opinion are managed as a set of opinions associated with the individual opinion. The individual opinion is, as described above, an opinion that have been written without disturbing the discussion held by the other participants. Each set of opinions can be displayed independently. Generally speaking, in many cases, a time point when a participant submits individual data, which is created without disturbing the discussion among the other participants, is the turning point of the discussion. Thus, the flow of the discussion can be understood easily in and after the meeting.

Further, the mode selector 19 is provided for selecting either the synchronous mode or the asynchronous mode for controlling writing of individual data and submitting it to be shared data. Therefore, the user can write individual data into the shared window easily and naturally without disturbing the discussion among other participants.

Furthermore, since the embodiment of the collaborative work support system of the present invention is provided with the automatic recovering section 20, the user can participate in the meeting insensible of the mode of the computer (the synchronous mode or asynchronous mode) and can concentrate in the discussion without caring operations for the system. For example, the automatic recovering section 20 makes the computer recover the synchronous mode if the user does not operate in a predetermined time. Therefore, even if the user forget to recover the synchronous mode during the oral discussion, the user can see the operation done by the other participants and is not required to stop the discussion.

In addition, the permission getting section 18 is provided for getting permission before submitting individual opinions. Therefore, collision of submission of individual data between participants can be avoided. In addition, after the user submits an opinion, he can explain at the same time he writes. Therefore, the user can continue the flow of the story to make a set of data in association with each other regarding a theme more efficiently. It would be also possible to get permission and continue writing after submission of individual data.

Since the submitted data display selector 21 is provided for selecting one of display and undisplay for each layer, only the main thread of the flow of the discussion can be displayed. In addition, the user can study the flow of the discussion from the different view point.

Since the page creator 22 is provided to create a new page by replacing layers that constitute the page. Thus, when there are plural threads of the flow of discussion, each thread can be discussed independently.

Since the writing layer selector 25 is provided to select the most appropriate layer, which is a set of opinions in association with each other, as a writing layer, the user can add a new opinion to the selected layer. Therefore, the more correct flow of discussion can be recorded.

Since data integrator 23 is provided for integrating contents each of which is independently discussed into a layer, the flow of discussion is recorded more faithfully.

Since the associating section 24 is provided to associate layers with each other, the flow of discussion can be adjusted and can be easily understood.

Since the multimedia data record & playback section 27 and the multimedia data playback instruction section 28 are provided to play back not only data written in the shared window but also each portion of video and sound data from the start easily, it is easier to understand the flow of discussion.

Since the discussion flow visualizing section 26 is provided for observing the flow of discussion visually, it is easier to understand the flow of discussion.

In this embodiment, data is sent via a network. But this invention is not restricted to this embodiment. For example, when each section constituting this invention is included in one computer, communication between processes and a bus communication can be used to send data instead of a network communication.

Figure 37:
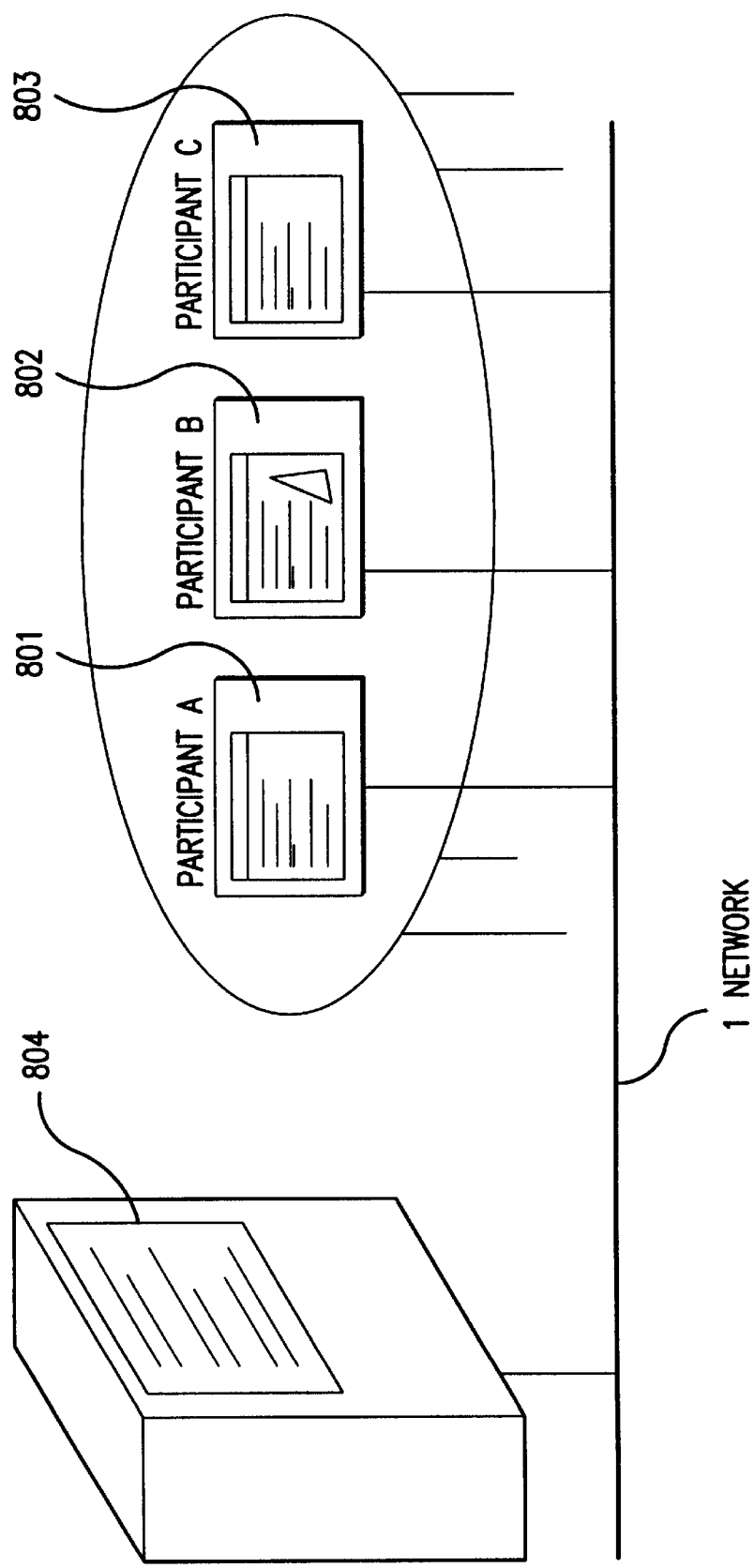
FIG. 37 shows a system configuration of the second embodiment of the collaborative work support system of the present invention.

FIG. 37 shows an embodiment of a configuration of the collaborative work support system of the present invention and screen images, when it is used in a meeting room.

This meeting room has pen computers 801, 802 and 803 that are used by participants A, B and C at hand, respectively, and a large-sized display 804 onto which the user can directly write by using an electronic pen to input data. The large-sized display 804 displays screen image of a personal computer. The pen computers and large-sized display works in cooperation with each other. The large-sized display 804 and the pen computers for participants A and C are on the synchronous mode, thus, have the same screen image. The pen computer for the participant B is on the asynchronous mode, thus, has a different screen image from the others. The participant B can submit opinion that he has written into the shared window of his own pen computer, i.e. individual data, so as to display on the pen computers for other participants and the large-sized display.

As described above, by using this invention, for example, when users have a design meeting in which the users discuss by using the shared window, a collaborative work support system and a method for managing data of collaborative work by which the user can easily understand a process of the discussion are provided.

In addition, this invention make it easier to reconstruct a set of opinions in association with each other and a turning point of the discussion. In particular, when once the point of question has changed and then the former point in question recovers, it is easy to change an association between opinions to make a new set of opinions in association with each other regarding a particular point in question. Therefore, a set of opinions in association with each other regarding a particular point in question can be reproduced.

It is assumed that, in many cases, change of layers being observed is equivalent to change point of points in question. Therefore, in this invention, a layer corresponds to a point in question. Thus, when once the point of question (layer) has changed to another and then the former point in question (layer) recovers, the change point of the points in question is recognized by evaluating the change of layers.

For example, when a participant submits individual data to the shared window in a pause of discussion A, discussion B regarding the submitted individual data starts. After that, another participant submits another individual data to recover the discussion A. In such case, since this invention manages shared data in a unit of a set of data in association with each other regarding each individual data, each set of data can be redisplayed independently. Thus, a discussion flow skipping the discussion B, that is a flow of the discussion A can be reproduced.

Further, the user can write individual data into the shared window with easy and natural operation without disturbing the discussion among other participants.

When the user does not operate after a predetermined time lapsed, the computer of the user automatically recovers the synchronous mode so that the screen image of the shared window of the computer becomes the same as those of the others. Thus, the user can always observe operations performed by the other participants and can participate in the discussion.

Furthermore, opinions can be managed as a set of opinions in association with each other regarding a submitted individual opinion. Therefore, when there are plural main threads in the flow of discussion, the user can discuss on each of them independently. In addition, the user can select a most appropriate set of opinions in association with each other, and add a new opinion thereto. Thus, a flow of discussion is recorded more correctly. Further, the user can makes contents each of which is discussed independently into one by integrating plural sets of opinions in association with each other. Therefore, the flow of discussion is recorded more honestly.

What is claimed is:

1. A collaborative work support system that supports collaborative work on a plurality of computers that are connected with each other and each of which is assigned for an operator and displays shared data, and each operator can change the displayed shared data on his own computer while other computers display the shared data, comprising:

shared data storage means for storing shared data to be displayed on each computer;

individual data storage means for storing individual data, which is individually created by a specific operator and individually displayed on any of the computers;

individual data sending means for sending the individual data to other computers in response to a command from the specific operator who created the individual data so as to display the individual data on other computers as created shared data;

management means for managing so that the individual data is stored in said shared data storage means with other data associated with the individual data as a unit of storage; and associating means for associating a plurality of units of storage with each other based on attributes regarding an association therebetween.

2. The collaborative work support system as set forth in claim 1, wherein each computer further comprises:

mode selecting means for selecting either a synchronous mode or a asynchronous mode of the computer;

the synchronous mode is the mode when the computer receives input data from the operator or receives data from other computers, the computer displays the input data or the data from the other computers, sends the input data to other computers, and stores the input data or the data from the other computers into said shared data storage means; and the asynchronous mode is the mode when the computer receives input data from the operator, the computer individually displays the input data and stores the input data into the individual data storage means.

3. The collaborative work support system as set forth in claim 2, wherein each computer further comprises:

permission getting means for getting permission for the computer to change the shared data; and said mode selecting means assigning the asynchronous mode to the computer, when the computer receives input data from the operator while the computer does not have the permission.

4. The collaborative work support system as set forth in claim 2, each computer further comprising:

automatic recovering means for controlling said mode selecting means to assign the synchronous mode to the computer, when a prescribed time lapses on the asynchronous mode after the operator stops inputting data.

5. The collaborative work support system as set forth in claim 2, each computer further comprising:

permission getting means for getting permission for the computer to change the shared data either before or after said individual data sending means sends the individual data;

said mode selecting means assigning the synchronous mode to the computer after said permission getting means gets the permission.

6. The collaborative work support system as set forth in claim 2, each computer further comprising:

permission getting means for getting permission for the computer to change the shared data either before or after said individual data sending means sends the individual data; and said individual data sending means sending the individual data when said permission getting means get the permission.

7. The collaborative work support system as set forth in claim 1, further comprising:

display control means for determining whether each unit of storage should be displayed or not.

8. The collaborative work support system as set forth in claim 1, further comprising:

display control means for displaying a page, which includes a set of layers overlapping with each other, each of the layers corresponding to each unit of storage.

9. The collaborative work support system as set forth in claim 8, further comprising:

page creation means for specifying a plurality of layers, and for creating a page from the specified set of the layers.

10. The collaborative work support system as set forth in claim 8, further comprising:

layer selecting means for selecting a layer to be displayed on each computer for operating.

11. The collaborative work support system as set forth in claim 1, further comprising:

data integrating means for selecting a plurality of the units of storage, and integrating the selected units of storage into a new unit of storage.

12. The collaborative work support system as set forth in claim 1, further comprising:

visualizing means for displaying a plurality of layers, each of which is corresponding to each unit of storage, arranged in the order of created date of each layer.

13. The collaborative work support system as set forth in claim 1, further comprising:

visualizing means for displaying a plurality of layers, each of which is corresponding to each unit of storage, arranged according to the attributes provided by said associating means.

14. The collaborative work support system as set forth in claim 1, further comprising:

said management means managing the shared data by associating each unit of storage with data of time when each unit of storage is being displayed;

multimedia data record/playback means for storing multimedia data regarding the collaborative work from when the collaborative work started; and multimedia data playback instruction means for instructing said multimedia data record/playback means to play back the multimedia data corresponding to the unit of storage according to the data of time associated with the unit of storage by said management means.

15. A method for managing data for collaborative work on a plurality of computers that are connected with each other and each of which is assigned for an operator and displays shared data, and each operator can change the displayed shared data on his own computer while other computers display the shared data, comprising the steps of:

receiving individual data, which is individually created by a specific operator and individually displayed on any of the computers;

sending the individual data to other computers in response to a command from the specific operator who created the individual data so as to display the individual data on other computers as created shared data;

managing so that the individual data is stored in said shared data storage means with other data associated with the individual data as a unit of storage; and associating a plurality of units of storage with each other based on attributes regarding an association therebetween.

* * * * *